US011334071B2

(12) United States Patent
Garcia

(10) Patent No.: US 11,334,071 B2
(45) Date of Patent: May 17, 2022

(54) TOWING METHODS AND APPARATUSES FOR COMPUTER ASSISTED OR AUTONOMOUS DRIVING

(71) Applicant: Intel Corporation, Santa Clara, CA (US)

(72) Inventor: Jason Garcia, Scottsdale, AZ (US)

(73) Assignee: Intel Corporation, Santa Clara, CA (US)

(*) Notice: Subject to any disclaimer, the term of this patent is extended or adjusted under 35 U.S.C. 154(b) by 213 days.

(21) Appl. No.: 16/228,175

(22) Filed: Dec. 20, 2018

(65) Prior Publication Data

US 2019/0129426 A1    May 2, 2019

(51) Int. Cl.
  *G05D 1/00*   (2006.01)
  *G05D 1/02*   (2020.01)
  *B62D 13/06*  (2006.01)
  *B62D 15/02*  (2006.01)

(52) U.S. Cl.
  CPC .......... *G05D 1/0088* (2013.01); *B62D 13/06* (2013.01); *B62D 15/0285* (2013.01); *G05D 1/0248* (2013.01); *G05D 1/0278* (2013.01); *G05D 2201/0213* (2013.01)

(58) Field of Classification Search
  CPC ......... G05D 1/0088; G05D 2201/0213; G05D 1/0275; B62D 13/06; B62D 15/0285
  See application file for complete search history.

(56) References Cited

U.S. PATENT DOCUMENTS

2013/0038436 A1*  2/2013  Brey ................. B60T 7/20
                                                340/431
2018/0319470 A1*  11/2018  Williams ............... B62D 13/06

OTHER PUBLICATIONS

"Total numbers of recreational boats in use in the U.S. from 2000 to 2016 (in millions)", retrieved on Mar. 20, 2019, 3 pages; Retrieved from the Internet: URL: www.statista.com/statistics/184587/number-of-recreational-boats-in-the-us/.
Ntel Corporation, "Computer Assisted or Autonomous Driving (Ca/Ad) Towing Vehicles and Trailers", Application No. PCT/CN2017/117521, Dec. 20, 2017, 52 pages.

* cited by examiner

*Primary Examiner* — Alan D Hutchinson
*Assistant Examiner* — Andy Schneider
(74) *Attorney, Agent, or Firm* — Schwabe, Williamson & Wyatt, P.C.

(57) ABSTRACT

Embodiments include apparatuses, methods, and systems for computer assisted or autonomous driving (CA/AD). An apparatus may include a towing data collection unit to collect data about a trailer, a watercraft, or another vehicle to be towed or being towed by a CA/AD vehicle, a navigation data collection unit to collect data about an operation area, and a vehicle control unit to assess suitability of operating the CA/AD vehicle with the trailer, watercraft, or the other vehicle in tow, and to navigate the CA/AD vehicle in the operation area. Other embodiments may also be described and claimed.

25 Claims, 18 Drawing Sheets

```
<WatercraftRampAreaNavigation>
  <WaterfrontAreaDetails>
    <Property Name="WaterfrontAreaName" Value="Saguaro Lake Regional Park" />
    <Property Name="County_State" Value="Maricopa County, AZ" />
    <BoatRampAreaDetails>
      <BoatRampProperties>
        <Property Name="BoatRampAreaName" Value="Miller's Boat Ramp" />
        <Property Name="VehicleLanes" Value="3" />
        <Property Name="Incline" Value="12 degrees" />
        <Property Name="SurfaceType" Value="Concrete" />
        <Property Name="SurfaceFeature" Value="Medium Grooves" />
      </BoatRampProperties>
      <IncomingMakeReadyDetails>
        <Property Name="MakeReadyAreaType" Value="None" />
        <Property Name="MakeReadyParkingConfiguration" Value="Rows" />
      </IncomingMakeReadyDetails>
      <IncomingRampAccessDetails>
        <Property Name="IncomingRampAccessRoadType" Value="Shared Lane" />
      </IncomingRampAccessDetails>
      <OutgoingMakeReadyDetails>
        <Property Name="MakeReadyAreaType" Value="Dedicated" />
        <Property Name="MakeReadyParkingConfiguration" Value="Parallel" />
      </OutgoingMakeReadyDetails>
      <ParkingAreaDetails>
        <Property Name="AreaName" Value="Area A" />
        <Property Name="ParkingConfiguration" Value="Rows" />
        <Property Name="ParkingOrientation" Value="Forward" />
      </ParkingAreaDetails>
      <ParkingAreaDetails>
        <Property Name="AreaName" Value="Area B" />
        <Property Name="ParkingConfiguration" Value="Rows" />
        <Property Name="ParkingOrientation" Value="Backward" />
      </ParkingAreaDetails>
      <ParkingAreaDetails>
        <Property Name="AreaName" Value="Area C" />
        <Property Name="ParkingConfiguration" Value="End-to-end" />
        <Property Name="ParkingOrientation" Value="Bi-Directional" />
      </ParkingAreaDetails>
      <ParkingAreaDetails>
        <Property Name="AreaName" Value="Area D" />
        <Property Name="ParkingConfiguration" Value="Parallel" />
        <Property Name="ParkingOrientation" Value="Flow of Traffic" />
      </ParkingAreaDetails>
    </BoatRampDetails>
  </WaterfrontAreaDetails>
</WatercraftRampAreaNavigation>
```

A) Ramp Properties
B) Incoming / Outgoing Details
C) Parking Area Details

Figure 1(e)

TOWING METHODS AND APPARATUSES FOR COMPUTER ASSISTED OR AUTONOMOUS DRIVING

FIELD

Embodiments of the present disclosure relate generally to the technical fields of vehicles, and more particularly to towing methods and apparatuses for computer assisted or autonomous driving.

BACKGROUND

A computer assisted or autonomous driving (CA/AD) vehicle, also referred to as a semi-autonomous vehicle, an autonomous vehicle, a driverless vehicle, a self-driving vehicle, a robotic vehicle, or an unmanned vehicle, may be a vehicle that is capable of sensing its environment and navigating without human input or with reduced human input for certain functions. CA/AD vehicles are gaining momentum and popularity. Currently, CA/AD vehicles mostly provide dynamic and personalized transportation services from a source to a destination. Some vehicles, e.g., all-terrain vehicles, or sport utility vehicles, may provide services for more than just mere transportation, e.g., outdoor sports and recreational activities. In providing outdoor sports and recreational activities, these vehicles often tow a trailer, in particular, a trailer with a watercraft, or even another vehicle. However, current technologies for CA/AD vehicles have not addressed these other usages beyond transportation.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 1(a)-1(e) illustrate an example computer assisted or autonomous driving (CA/AD), incorporated with the towing technology of the present disclosure, to navigate an operation area, in accordance with various embodiments.

DETAILED DESCRIPTION

Figure 1A:
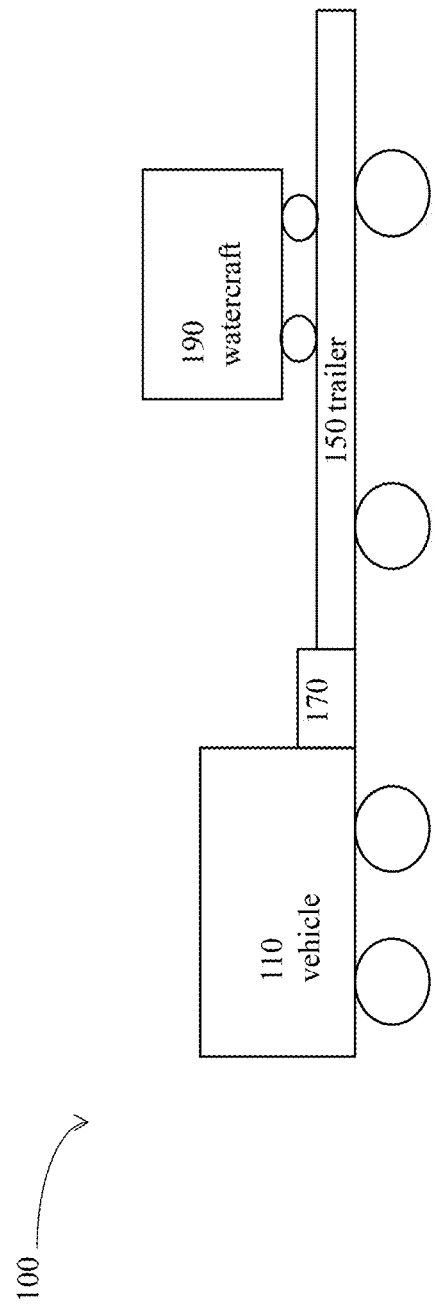

Computer assisted or autonomous driving (CA/AD) vehicles are gaining momentum and popularity. The Society of Automotive Engineers (SAE) has defined autonomy levels for CA/AD vehicles, including level 0 to level 5, to indicate various levels of automated systems and features in a CA/AD vehicle. However, current CA/AD vehicles provide mostly transportation functions rather than other kinds of functions, e.g., trailers for outdoor sports and recreational activities, watercrafts, boats, or an all-terrain vehicle. In addition, current CA/AD vehicles may be limited to the highway but are insufficient to enable other use cases. A CA/AD vehicle with a trailer, a watercraft or another vehicle in tow may be referred to as a CA/AD towing vehicle.

In embodiments, an apparatus for CA/AD may include an in-vehicle system (IVS) of a CA/AD vehicle incorporated with the towing technology of the present disclosure to assist the CA/AD vehicle to tow a trailer, a watercraft, or another vehicle and navigate an operation area. The operation area may include a service area, a parking area, and/or a boat ramp area. The in-vehicle system (IVS) is configured to assess suitability of operating the CA/AD vehicle with the trailer, watercraft, or another vehicle in tow in the operation area, and control or assist in control operations of the CA/AD vehicle to navigate the CA/AD vehicle in the operation area with the trailer, watercraft, or the other vehicle in tow, upon assessing that it is suitable to operate the CA/AD vehicle with the trailer, watercraft or another vehicle.

In embodiments, the IVS includes a towing data collection unit disposed in a CA/AD vehicle, and a vehicle control unit disposed in the CA/AD vehicle and coupled to the towing data collection unit. The towing data collection unit is configured to collect data about a trailer, a watercraft, or another vehicle to be towed or being towed by the CA/AD vehicle. The vehicle control unit is to assess suitability of operating the CA/AD vehicle with the trailer, watercraft, or the other vehicle in tow, based at least in part on the data about the trailer, the watercraft, or the other vehicle collected by the towing data collection unit.

In embodiments, the IVS includes a navigation data collection unit disposed in a CA/AD vehicle, and a vehicle control unit disposed in the CA/AD vehicle and coupled to the navigation data collection unit. The navigation data collection unit is configured to collect data about an operation area. The vehicle control unit is configured to control operations of the CA/AD vehicle to navigate the CA/AD vehicle in the operation area with a trailer, a watercraft, or another vehicle in tow, based at least in part on the data about the operation area collected by the navigation data collection unit, and data about the trailer, the watercraft, or the other vehicle.

In embodiments, one or more non-transitory computer-readable media includes instructions that cause an in-vehicle system (IVS) of a CA/AD vehicle, in response to execution of the instructions by the IVS, to collect data about a trailer, a watercraft, or another vehicle to be towed or being towed by the CA/AD vehicle; and collect data about an operation area. The instructions further cause the IVS, in response to execution of the instructions by the IVS, to assess suitability of operating the CA/AD vehicle with the trailer, watercraft, or the other vehicle in tow in the operation area, or to control (or to assist in control) operations of the CA/AD vehicle to navigate the CA/AD vehicle in the operation area with the trailer, watercraft, or the other vehicle in tow, based at least in part on the collected data about the operation area, and the collected data about the trailer, the watercraft, or the other vehicle.

In the description to follow, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used hereinafter, including the claims, the term "unit," "engine," "module," or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a general purpose processing unit (GPU), a single-core processor, a dual-core processor, a triple-core processor, a quad-core processor, and/or any other device capable of executing or otherwise operating computer-executable instructions, such as program code, software modules, and/or functional processes.

As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices", "computer systems", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management Systems (EEMSs), electronic/engine control units (ECUs), vehicle-embedded computer devices (VECDs), autonomous or semi-autonomous driving vehicle (hereinafter, simply ADV) systems, in-vehicle navigation systems, electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

FIGS. 1(a)-1(e) illustrate an example apparatus 100 for CA/AD, where the apparatus 100 includes a CA/AD vehicle 110 incorporated with the towing technology of the present disclosure to assist the CA/D vehicle 110 in navigating an operation area 181 with a trailer 150 having a watercraft 190 in tow, in accordance with various embodiments. For clarity, features of the apparatus 100, the CA/AD vehicle 110, the trailer 150, the watercraft 190, and the operation area 181, may be described below as an example for understanding an apparatus for CA/AD, a CA/AD vehicle, a trailer, a watercraft, and an operation area. It is to be understood that there may be more or fewer components included in the apparatus 100, the CA/AD vehicle 110, the trailer 150, the watercraft 190, and the operation area 181. Further, it is to be understood that one or more of the devices and components within the apparatus 100, the CA/AD vehicle 110, the trailer 150, the watercraft 190, and the operation area 181, may include additional and/or varying features from the description below, and may include any devices and components that one having ordinary skill in the art would consider and/or refer to as the devices and components of an apparatus for CA/AD, a CA/AD vehicle, a trailer, a watercraft, and an operation area.

Figure 1B:
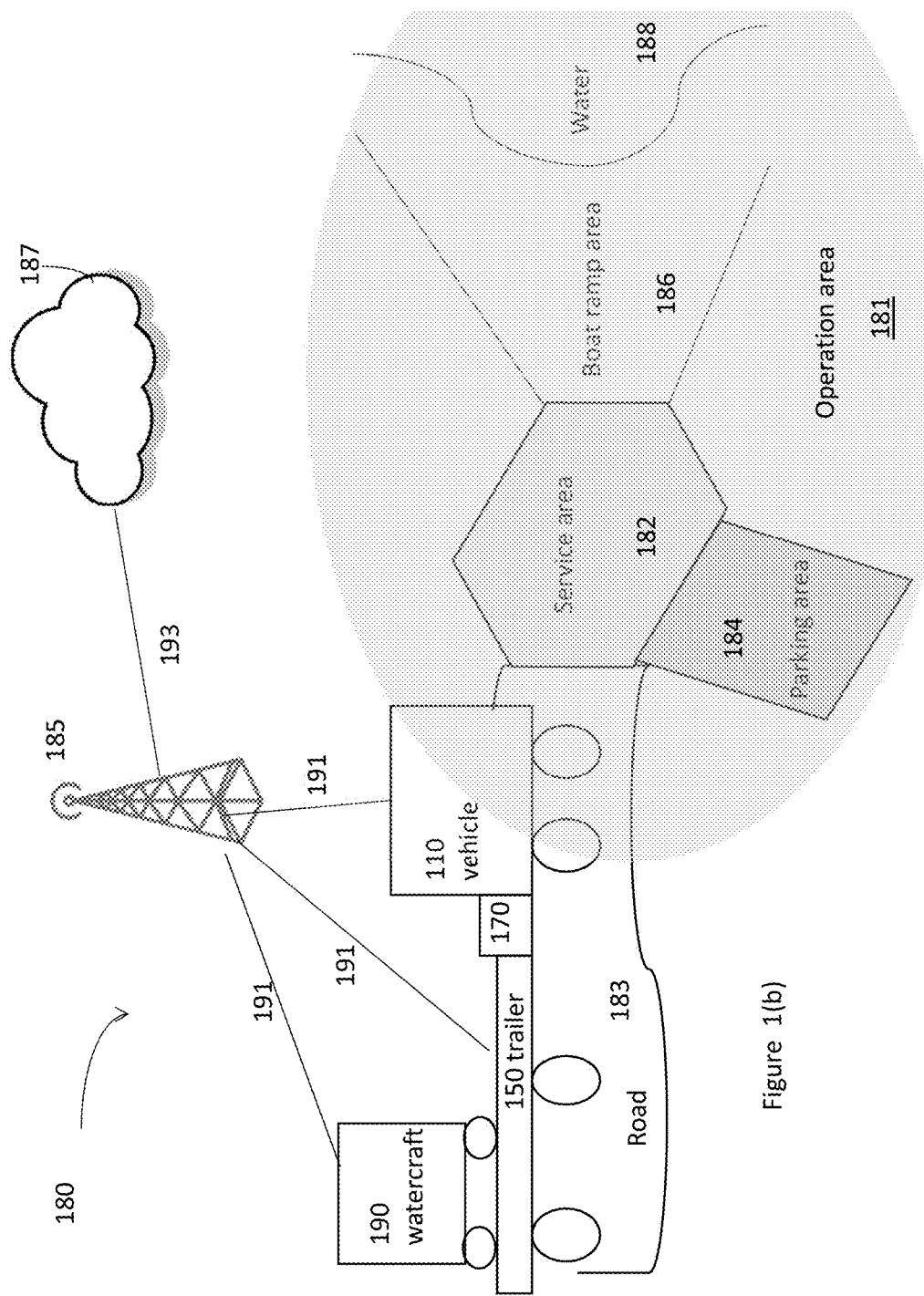
Figure 1C:
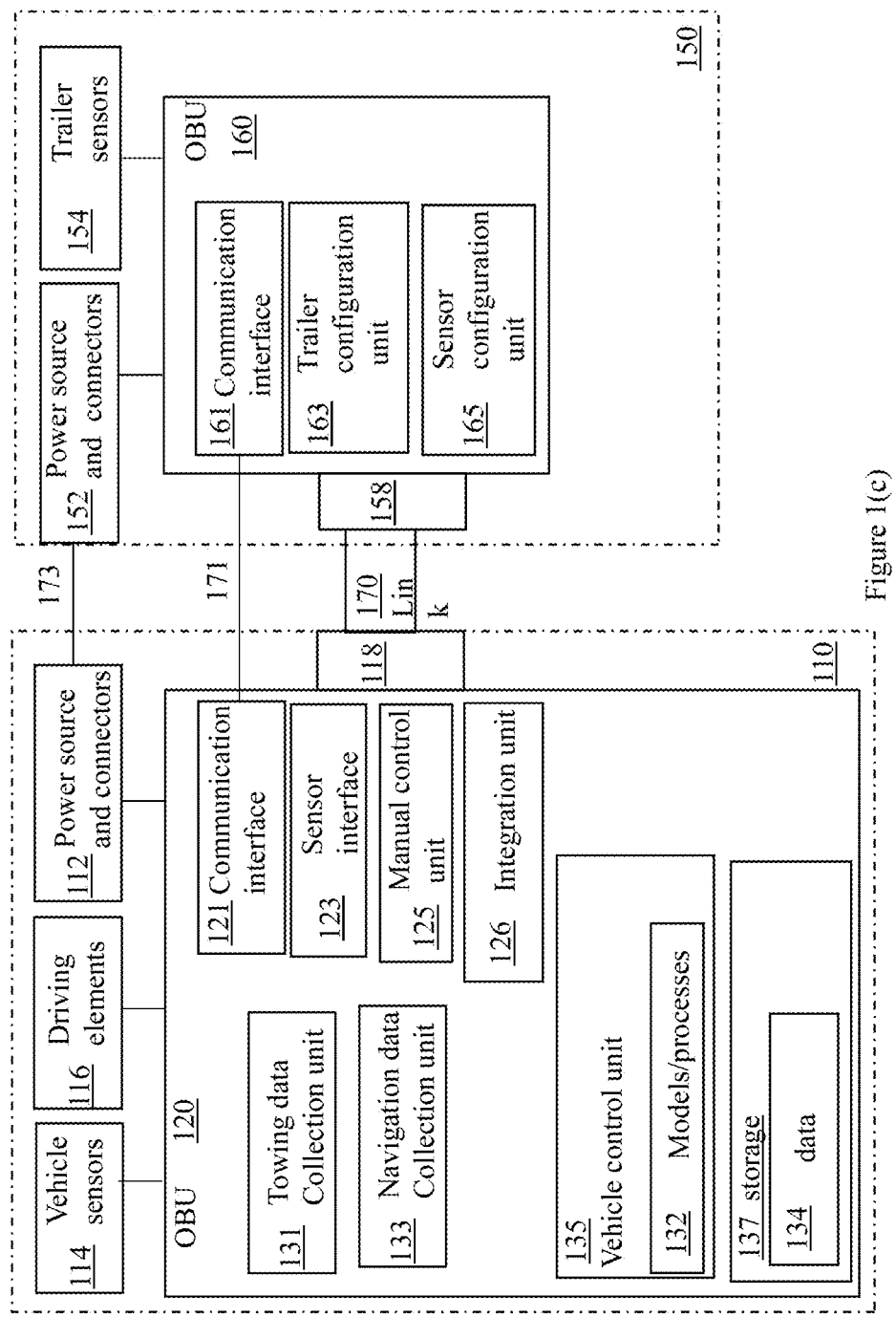
Figure 1D:
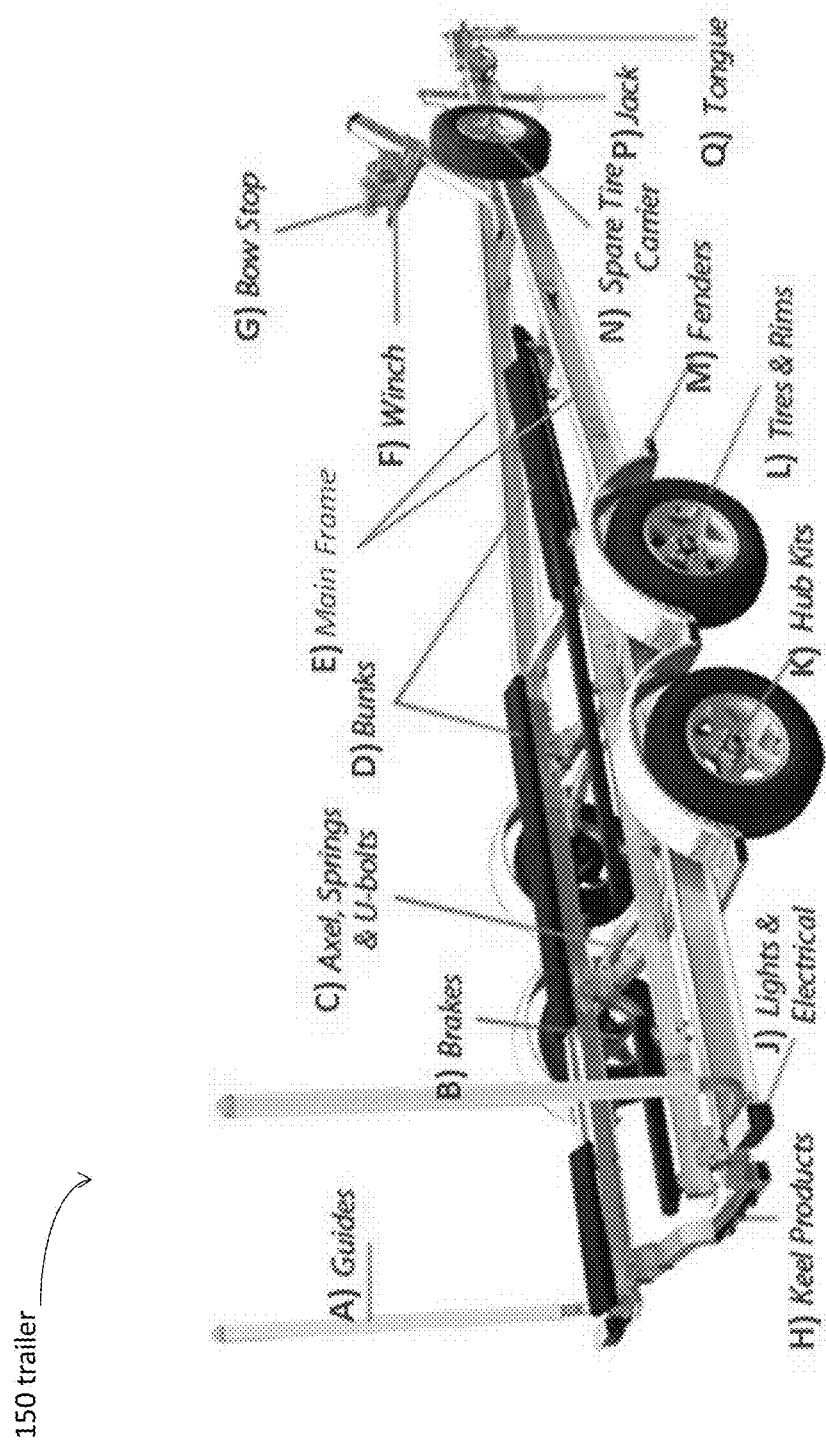

In embodiments, as illustrated in FIG. 1(a), the apparatus 100 for CA/AD includes the CA/AD vehicle 110 incorporated with the towing technology of the present disclosure, coupled to the trailer 150 through a link 170, while the watercraft 190 is placed on the trailer 150. As illustrated in FIG. 1(b), the CA/AD vehicle 110, the trailer 150, and the watercraft 190 may operate in the operation area 181, within an environment 180, including a wireless access node 185, and a cloud computing service 187 (also referred to as "cloud 187", "the cloud 187", and the like). The operation area 181 may include a service area 182, a parking area 184, and/or a boat ramp area 186 that may be adjacent to a body of water 188. More details of the CA/AD vehicle 110, the trailer 150, and the operation area 181 are illustrated in FIGS. 1(c)-1(e).

In embodiments, as illustrated in FIG. 1(b), except for the towing technology of the present disclosure incorporated therein, the CA/AD vehicle 110 and the trailer 150 may be any type of motorized vehicle or device used for transportation of people or goods, which may be equipped with controls used for driving, parking, passenger comfort and/or safety, etc. The terms "motor", "motorized", etc., as used herein may refer to devices that convert one form of energy into mechanical energy, and may include internal combustion engines (ICE), compression combustion engines (CCE), electric motors, and hybrids (e.g., including an ICE/CCE and electric motor(s)). In embodiments, the CA/AD vehicle 110 may be a selected one of a commercial truck, a light duty car, a sport utility vehicle (SUV), a light vehicle, a heavy duty vehicle, a pickup truck, a van, a car, a motorcycle, or any other towing vehicle. The trailer 150 may include a selected one of a boat, an all-terrain vehicle, a general purpose trailer, a mobile home, a motorcycle trailer, a bicycle trailer, a utility trailer, a travel trailer, a camper, a genset trailer, a pusher trailer, a semi-trailer, or a full trailer. The watercraft 190 may be a vessel that travels on water, e.g., a ship, a boat, a surfboard, an underwater robot, a seaplane, a personal watercraft, or a torpedo.

In embodiments, the CA/AD vehicle 110, the trailer 150, and/or the watercraft 190 may communicate with the wireless access node 185 through one or more links 191, and the wireless access node 185 communicates with the cloud 187 through a link 193. In embodiments, the wireless access node 185 may obtain data from the cloud 187 over link 193, and may provide that data to the CA/AD vehicle 110, the trailer 150, or the watercraft 190, over link(s) 191.

In embodiments, the wireless access node 185 may be one or more hardware computer devices configured to provide wireless communication services to mobile devices within a coverage area or cell associated with the wireless access node 185. The wireless access node 185 may include a transmitter/receiver (or alternatively, a transceiver) connected to one or more antennas, one or more memory devices, one or more processors, one or more network interface controllers, and/or other like components. The one or more transmitters/receivers may be configured to transmit/receive data signals to/from one or more mobile devices via a link (e.g., link 191). Furthermore, one or more network interface controllers may be configured to transmit/receive with various network elements (e.g., one or more servers within a core network, etc.) over another backhaul connection (not shown). The communications circuitry in the CA/AD vehicle 110, the trailer 150, and/or the watercraft 190 may communicate with the wireless access node 185 in accordance with one or more wireless communications protocols as discussed herein.

In embodiments, the cloud 187 may include various cloud services and technologies by computer servers or devices for processing, accessing, or storing data with respect databases. For example, the cloud 187 may include mapping services or databases, which may be provided by Google Maps®, Civil Maps®, Tomtom®, etc. The cloud 187 may further include various governmental agency services or databases. For example, the cloud 187 may include city, county, state, or federal agency databases.

In embodiments, the operation area 181 includes the service area 182, the parking area 184, and/or the boat ramp area 186 that may be adjacent to a body of water 188. The apparatus 100 may enter the operation area 181 through a road 183. The service area 182 may be a make ready area to be used by a user to have the CA/AD vehicle 110 to be coupled to the trailer 150 through a link 170, while the watercraft 190 may be placed on the trailer 150. The service area 182, the parking area 184, and the boat ramp area 186 and their configurations are shown as examples only and are not limiting. The operation area 181 may include various parking areas, service areas, and boat ramp areas. For example, the parking area 184 may include pull forward parking zones, back-in parking zones, stacked parking zones, parallel parking zones, shared lanes, or outgoing staging zones. The service area 182, the parking area 184, and the boat ramp area 186 may further include entrance, lanes, and multiple subareas.

In embodiments, as illustrated in FIG. 1(c), the CA/AD vehicle 110 may be coupled to the trailer 150 through the link 170, which may be a mechanical link, to connect a coupler 118 of the CA/AD vehicle 110 and a coupler 158 of the trailer 150. In addition, the CA/AD vehicle 110 may communicate with the trailer 150 via a communication link 171 through a communication interface 121 of the CA/AD vehicle 110 and a communication interface 161 of the trailer 150. Furthermore, the CA/AD vehicle 110 may be coupled to the trailer 150 via a power source connection 173 through one or more power source and connectors 112 of the CA/AD vehicle 110 and one or more power source and connectors 152 of the trailer 150.

In embodiments, the CA/AD vehicle 110 includes a vehicle onboard unit (OBU) 120, the coupler 118, one or more sensors 114 disposed on the CA/AD vehicle 110, one or more driving elements 116, and one or more power source and connectors 112. The OBU 120 may include the communication interface 121, a sensor interface 123, a manual control unit 125, an integration unit 126, and other functional units or modules. In addition, the OBU 120 includes a towing data collection unit 131, a navigation data collection unit 133, a vehicle control unit 135, and a storage 137. In embodiments, the trailer 150 may include the coupler 158, one or more power source and connectors 152, one or more sensors 154 disposed on the trailer 150, and an OBU 160. The OBU 160 may include a sensor configuration unit 165, a trailer configuration unit 163, and the communication interface 161. In some embodiments, the OBU 120 or the OBU 160 may be referred to as an in-vehicle system (IVS).

In embodiments, the towing data collection unit 131 is configured to collect data about the trailer 150, the watercraft 190, or another vehicle to be towed or being towed by the CA/AD vehicle 110. The navigation data collection unit 133 is configured to collect data about an operation area, e.g., the operation area 181 shown in FIG. 1(b). The towing data collection unit 131 and the navigation data collection unit 133 may interact or communicate with the communication interface 121, the sensor interface 123, the sensor configuration unit 165, the trailer configuration unit 163, or the communication interface 161. In embodiments, the data collected by the towing data collection unit 131 or the navigation data collection unit 133 may be a part of the data 134 stored in the storage 137.

In embodiments, the vehicle control unit 135 is configured to assess suitability of operating the CA/AD vehicle 110 with the trailer 150, the watercraft 190, or the other vehicle in tow, based at least in part on the data about the trailer 150, the watercraft 190, or the other vehicle collected by the towing data collection unit 131. In addition, the vehicle control unit 135 is configured to control operations of the CA/AD vehicle 110 to navigate the CA/AD vehicle 110 in an operation area, e.g., the operation area 181 shown in FIG. 1(b), with the trailer 150, the watercraft 190, or another vehicle in tow based at least in part on the data about the operation area collected by the navigation data collection unit 133, and data about the trailer 150, the watercraft 190, or the other vehicle collected by the towing data collection unit 131. The vehicle control unit 135 may operate based on various models or processes 132 on data 134 stored in the storage 137. For example, the models or processes 132 may be fixed logic based processes, adaptive learning processes, or machine learning processes.

In embodiments, the coupler 118 of the CA/AD vehicle 110, or the coupler 158 of the trailer 150, may include a selected one of a ball and socket coupler, a gooseneck trailer jack, a straight coupler, an a-frame coupler, or an adjustable coupler. The communication technology 171 through the communication interface 121 of the CA/AD vehicle 110 and the communication interface 161 of the trailer 150 may include a wireless technology or a wired technology selected from dedicated short range communications (DSRC) technology, Bluetooth technology, wireless fidelity (WiFi) technology, wireless local network (WLAN), cellular wireless network technology, wireless universal serial bus (WUSB) technology, or short range radio technology. The communication interface 121 or the communication interface 161 may receive various data packets and/or data streams, navigation signaling/data (e.g., global navigation satellite system (GNSS), global positioning system (GPS), etc.), and/or the like. In embodiments, the communication interface 121 or the communication interface 161 may also include, or operate in conjunction with communications circuitry and/or input/output (I/O) interface circuitry in order to obtain the data for the various sources. For example, the communication interface 121 or the communication interface 161 may include an interface an input/output (I/O) or bus interface, such as a $I^2$ bus, an Integrated Drive Electronic (IDE) bus, a Serial Advanced Technology Attachment (SATA) bus, a Peripheral Component Interconnect (PCI) bus, a Universal Serial Bus (USB), a Near Field Communication (NFC) interface, a Bluetooth® interface, WiFi, and so forth. In addition, the communication interface 121 or the communication interface 161 may generate and transmit data to the wireless access node 185 over link 191 as shown in FIG. 1(b).

In embodiments, the integration unit 126 may determine a combined level of driving automation for the CA/AD vehicle 110 and the trailer 150. For example, the CA/AD vehicle 110 alone may have an initial level of driving automation. After the CA/AD vehicle 110 is combined with the trailer 150 to tow the trailer 150, the combined vehicle including the CA/AD vehicle 110 and the trailer 150 may have a combined level of driving automation less than the initial level of driving automation for the CA/AD vehicle 110. For example, a trailer equipped with only ultrasonic and video sensors may not be eligible for level 3, level 4, or level 5 of driving automation, due to the lack of longer ranged sensors (e.g., LiDAR/RADAR). If the CA/AD vehicle 110 has an initial level of driving automation of level 3 or higher, the combined vehicle including the CA/AD vehicle 110 and the trailer 150 may have a combined level of driving automation less than level 3. In addition, other factors of sensors such as resolution, range, data collection rate, etc., of the sensors may also play a role in determining a combined level of driving automation for the combined vehicle including the CA/AD vehicle 110 and the trailer 150.

In embodiments, the sensor interface 123 may receive sensor data from one or more sensors 114 disposed on the CA/AD vehicle 110. For example, the sensor data may include one or more selected from radar data, ultrasonic sensor data, video sensor data, light detection and ranging (LiDAR) data, global positioning system (GPS) data, two dimensional camera data, three dimensional camera data, location sensor data, water pressure sensor data, force sensor data, load sensor data, pitch sensor data, or accelerometer data. In addition, for the trailer 150, the sensor configuration unit 165 may collect sensor configuration data for the one or more sensors 154. The trailer configuration unit 163 may collect trailer configuration data. The communication interface 161 may transmit the sensor configuration data and the trailer configuration data to the CA/AD vehicle 110.

In embodiments, the sensor configuration data may include a number of sensors disposed on the trailer, and further include sensor types, sensor locations on the trailer, manufacturers of the sensors, resolutions of the sensors, ranges of the sensors, or data collection rates of the sensors. The sensor configuration data may enable sensors from any third party, instead of the manufacturer of the CA/AD vehicle 110 or the trailer 150 to be used, and information about such third party sensors may be integrated into the functions of the CA/AD vehicle 110 or the trailer 150.

In embodiments, as shown in FIG. 1(d), the trailer configuration data for the trailer 150 may include various components, e.g., guides, brakes, axle, springs, and U-bolts, bunks, main frame, winch, bow stop, keel products, lights and electrical components, hub kits, tires and rims, fenders, spare tire carrier, jack, and tongue. In addition, the trailer configuration data may further include a trailer length, a trailer width, a trailer height, a trailer wheel or axle distance measured from one end of the trailer, a trailer wheel or axle distance measured from another end of the trailer, a location of a coupler of the trailer, a trailer weight, a trailer shape, a trailer type, a trailer manufacturer, or a trailer capacity. A commercial fleet may commonly include a range of CA/AD vehicles and a range of trailers. It may also be common for a commercial fleet to mix and match the specific CA/AD vehicle to a specific trailer. Similarly, an individual owner may own multiple trailers that they interchange as needed. The trailer configuration data may enable a CA/AD vehicle to tow a variety of trailers.

In embodiments, the sensor data received by the sensor interface 123 from one or more sensors 114, the sensor configuration data, the trailer configuration data may be a part of the data 134 stored in the storage 137. In addition, the data 134 may further include other kinds of data. For example, the data 134 may include data about the trailer 150, the watercraft 190, or the other vehicle collected by the towing data collection unit 131; or data about the operation area 181 collected by the navigation data collection unit 133.

For example, the data about the trailer 150, the watercraft 190, or the other vehicle collected by the towing data collection unit 131 may include data about the trailer 150, the watercraft 190, or the other vehicle collected during operation of the CA/AD vehicle 110 with the trailer 150, the watercraft 190 or the other vehicle in tow; data about the trailer 150, the watercraft 190, or the other vehicle collected in a controlled environment; data about the trailer 150, the watercraft 190, or the other vehicle collected at multiple points of time or multiple locations to establish interdependencies between the data; data about the trailer 150, the watercraft 190, or the other vehicle accumulated over time; crowdsourced data from other CA/AD vehicles about the trailer 150, the watercraft 190, or the other vehicle; or public data, subscription service data, vehicle original equipment manufacturer (OEM data), or user configured data through the manual control unit 125 about the trailer, the watercraft, or the other vehicle.

In embodiments, the data 134 may include the data about the trailer 150, the watercraft 190, or the other vehicle collected by the towing data collection unit, which may include engine revolutions per minute (RMP) of an engine vehicle pitch, angle, speed, tire size, number of axles, dry weight, data about automated changes to transmission shifting behaviors, gas mileage, acceleration, throttle control profile, braking control profile, vehicle altitude, or dimensional data of the CA/AD vehicle, the trailer, or the watercraft.

In embodiments, the data 134 may include the data about the operation area 181 collected by the navigation data collection unit 133. For example, the data 134 may include data about incoming traffic, outgoing traffic, a queue of waiting vehicles, or configuration of the parking area 184 or the service area 182. Moreover, the data 134 may include data about the boat ramp area 186 includes data about ramp surface conditions relevant to traction, surface roughness of the boat ramp area, slope of the boat ramp area, water level, water edge location, or weather data including icy condition or mossy condition data.

In embodiments, as shown in FIG. 1(e), the data about the operation area 181 includes ramp properties for the boat ramp area 186, incoming and outgoing details for the service area 182, and parking area details for the parking area 184. For example, the boat ramp area 186 may have a name (BoatRampAreaName), a number of vehicle lanes (VehicleLanes), a slope of the incline of the boat ramp area surface (Incline), texture of the boat ramp area surface (SurfaceTexture), and other variables.

In embodiments, the data 134 may be communicated between the storage 137 and the cloud 187 through the wireless access node 185, as shown in FIG. 1(b). As an example, the wireless access node 185 may be a base station associated with a cellular network (e.g., an eNB in an LTE network, a gNB in a new radio access technology (NR) network, a WiMAX base station, etc.), an RSU, a remote radio head, a relay radio device, a small cell base station (e.g., a femtocell, picocell, home evolved nodeB (HeNB), and the like), or other like network element. In embodiments where the wireless access node is a base station, the wireless access node 185 may be deployed outdoors to provide communications for the vehicle 110 when the vehicle 110 is operating at large, for example when deployed on public roads, streets, highways, etc.

In some embodiments, the wireless access node 185 may be a gateway (GW) device that may include one or more processors, communications systems (e.g., including network interface controllers, one or more transmitters/receivers connected to one or more antennas, and the like), and computer readable media. In such embodiments, the GW may be a wireless access point (WAP), a home/business server (with or without radio frequency (RF) communications circuitry), a router, a switch, a hub, a radio beacon, and/or any other like network device. In embodiments where the wireless access node 185 is a GW, the wireless access node 185 may be deployed in an indoor setting, such as a garage, factory, laboratory or testing facility, and may be used to provide communications for while parked, prior to sale on the open market, or otherwise not operating at large.

In embodiments, the cloud 187 may represent the Internet, one or more cellular networks, a local area network (LAN) or a wide area network (WAN) including proprietary and/or enterprise networks, Transfer Control Protocol (TCP)/Internet Protocol (IP)-based network, or combinations thereof. In such embodiments, the cloud 187 may be associated with network operator who owns or controls equipment and other elements necessary to provide network-related services, such as one or more base stations or access points (e.g., wireless access node 185), one or more servers for routing digital data or telephone calls (for example, a core network or backbone network), etc. Implementations, components, and protocols used to communicate via such services may be those known in the art and are omitted herein for the sake of brevity.

In some embodiments, the cloud 187 may be a system of computer devices (e.g., servers, storage devices, applications, etc. within or associated with a data center or data warehouse) that provides access to a pool of computing resources. The term "computing resource" may refer to a physical or virtual component within a computing environment and/or within a particular computer device, such as memory space, processor time, electrical power, input/output operations, ports or network sockets, and the like. In these embodiments, the cloud 187 may be a private cloud, which offers cloud services to a single organization; a public cloud, which provides computing resources to the general public and shares computing resources across all customers/users; or a hybrid cloud or virtual private cloud, which uses a portion of resources to provide public cloud services while using other dedicated resources to provide private cloud services. For example, the hybrid cloud may include a private cloud service that also utilizes one or more public cloud services for certain applications or users, such as providing obtaining data from various data stores or data sources. In embodiments, a common cloud management platform (e.g., implemented as various virtual machines and applications hosted across the cloud 187 and database systems) may coordinate the delivery of data to the OBU of the CA/AD vehicle 110 and the OBU of the trailer 150. Implementations, components, and protocols used to communicate via such services may be those known in the art and are omitted herein for the sake of brevity.

Figure 2:
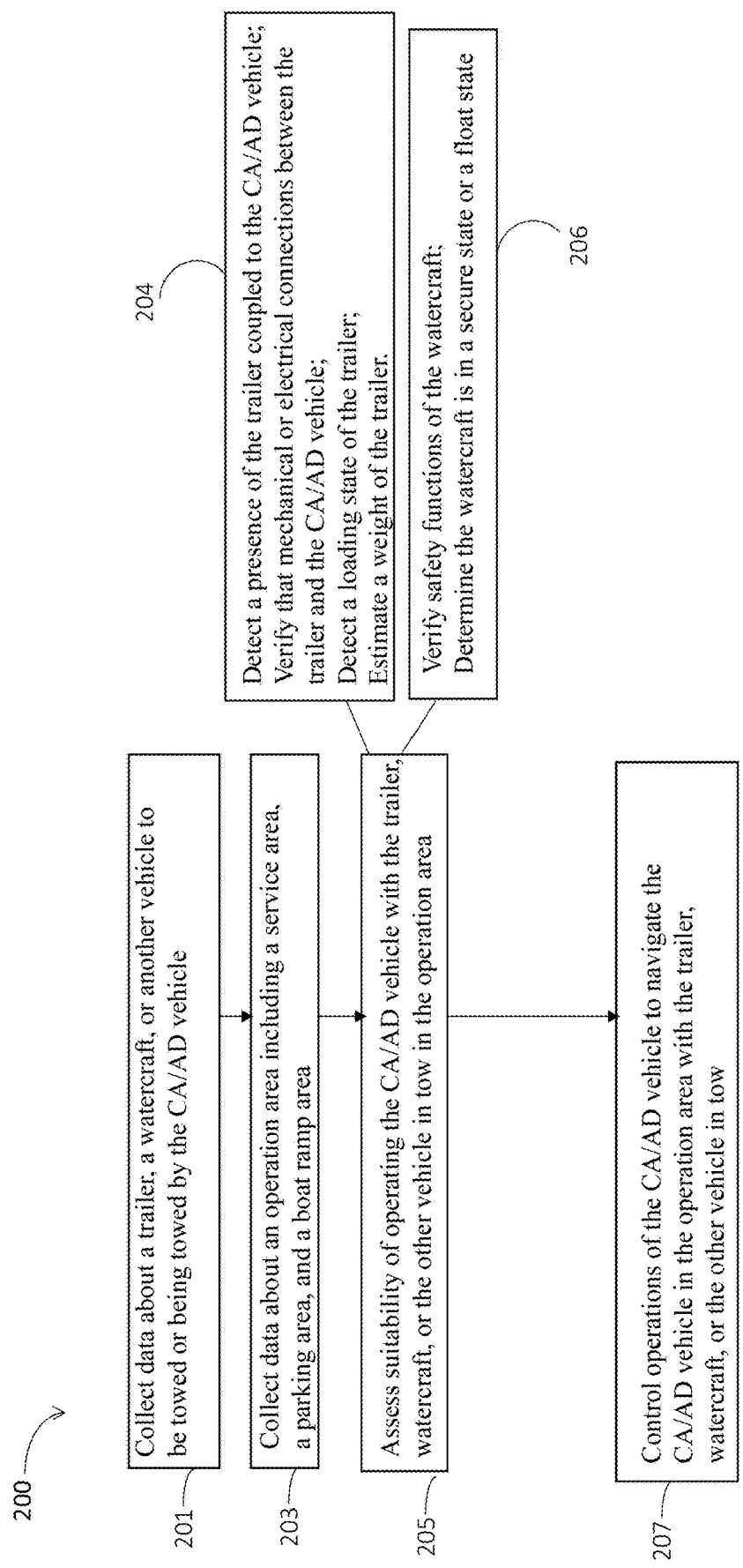
FIG. 2 illustrates an example towing process to be performed by a CA/AD vehicle with a trailer and/or a watercraft to navigate an operation area, in accordance with various embodiments.

FIG. 2 illustrates an example towing process 200 to be performed by a CA/AD vehicle with a trailer and a watercraft in tow to navigate an operation area, in accordance with various embodiments. In embodiments, the process 200 may be performed by the CA/AD vehicle 110 together with the trailer 150 and/or the watercraft 190 to navigate the operation area 181 as shown in FIGS. 1(a)-1(e).

The process 200 may start at an interaction 201. During the interaction 201, operations may be performed to collect data about a trailer, a watercraft, or another vehicle to be towed or being towed by the CA/AD vehicle. For example, at the interaction 201, operations may be performed by the towing data collection unit 131 of the CA/AD vehicle 110 to collect data about the trailer 150, the watercraft 190, or another vehicle to be towed or being towed by the CA/AD vehicle 110.

During an interaction 203, operations may be performed to collect data about an operation area including a service area, a parking area, and a boat ramp area. For example, at the interaction 203, operations may be performed by the navigation data collection unit 133 to collect data about the operation area 181. The operation area 181 includes the service area 182, the parking area 184, and the boat ramp area 186 that may be adjacent to water 188.

During an interaction 205, operations may be performed to assess suitability of operating the CA/AD vehicle with the trailer, watercraft, or the other vehicle in tow in the operation area. For example, at the interaction 205, operations may be performed by the vehicle control unit 135 to assess suitability of operating the CA/AD vehicle 110 with the trailer 150, the watercraft 190, or the other vehicle in tow in the operation area 181. The operations for assess suitability of operating the CA/AD vehicle may have various categories. For example, as shown in an interaction 204, operations may be performed by the vehicle control unit 135 to detect a presence of the trailer coupled to the CA/AD vehicle; verify that mechanical or electrical connections between the trailer and the CA/AD vehicle are in operational states; detect a loading state of the trailer; or estimate a weight of the trailer. In addition, as shown in an interaction 206, operations may be performed by the vehicle control unit 135 to verify safety functions of the watercraft; or determine the watercraft is in a secure state or a float state. More details of such operations may be shown in FIGS. 3(a)-3(d) and FIGS. 4(a)-4(b).

During an interaction 207, operations may be performed to control or assist in the control of operations of the CA/AD vehicle to navigate the CA/AD vehicle in the operation area with the trailer, watercraft, or the other vehicle in tow. For example, at the interaction 207, operations may be performed by the vehicle control unit 135 to control or assist in the control of operations of the CA/AD vehicle 110 to navigate the CA/AD vehicle 110 in the operation area 181 with the trailer 150, the watercraft 190, or the other vehicle in tow. For example, operations may be performed by the vehicle control unit 135 to control operations of the CA/AD vehicle to navigate or park the CA/AD vehicle in the service or parking area with the trailer, the watercraft, or the other vehicle in tow; control operations of the CA/AD vehicle to navigate the CA/AD vehicle in the boat ramp area to launch or retrieve the watercraft; or determine whether the trailer is positioned for the watercraft to be retrieved from water onto the trailer or to be inserted into the water from the trailer. More details of such operations may be shown in FIGS. 5(a)-5(d).

The operations may be based at least in part on the collected data about the operation area 181, and the collected data about the trailer 150, the watercraft 190, or the other vehicle. For example, such data may be included in the data 134 stored in the storage 137, or data from the cloud 187, or stored in any storage device in a system architecture supporting the operation of the process 200.

Figure 3A:
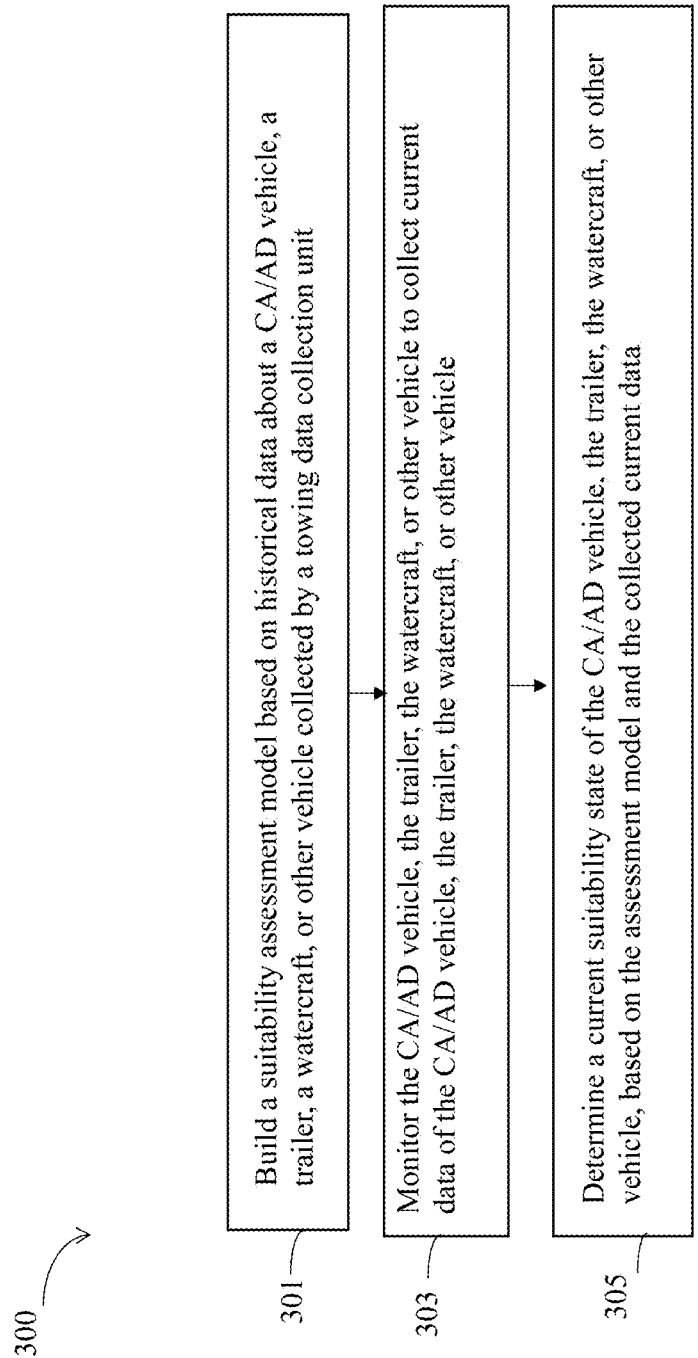
FIGS. 3(a)-3(d) illustrate example processes to be performed to assess suitability of operating a CA/AD vehicle with a trailer, a watercraft, or another vehicle in tow in an operation area, in accordance with various embodiments.
Figure 3B:
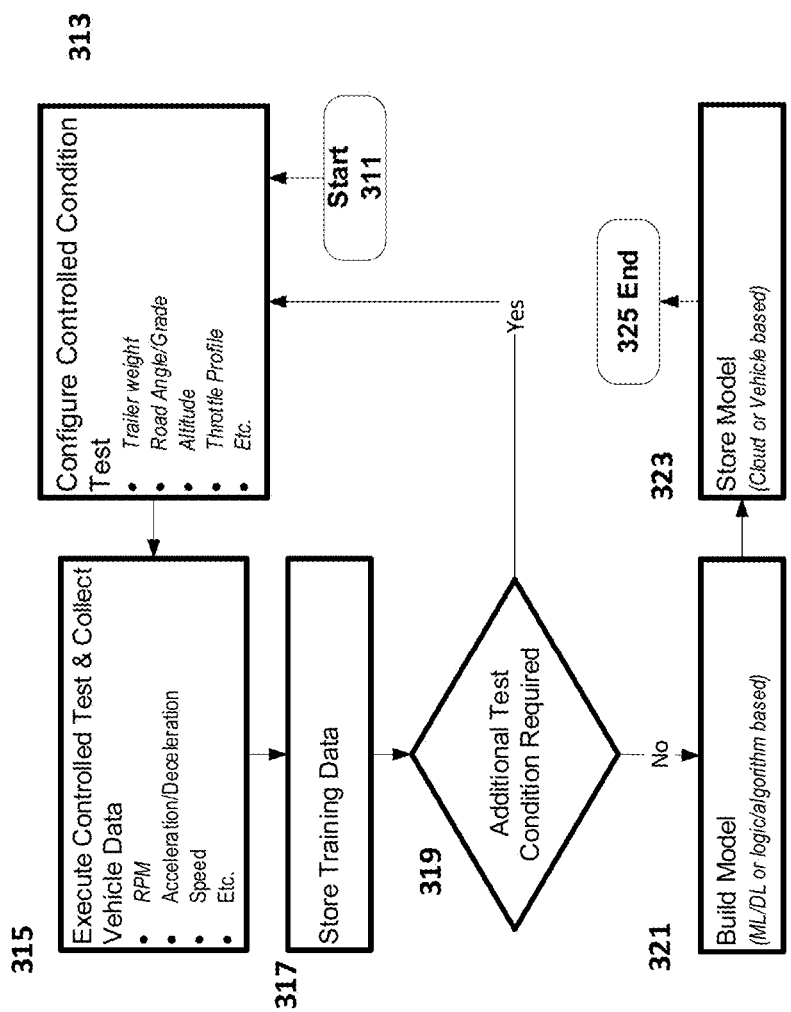
Figure 3C:
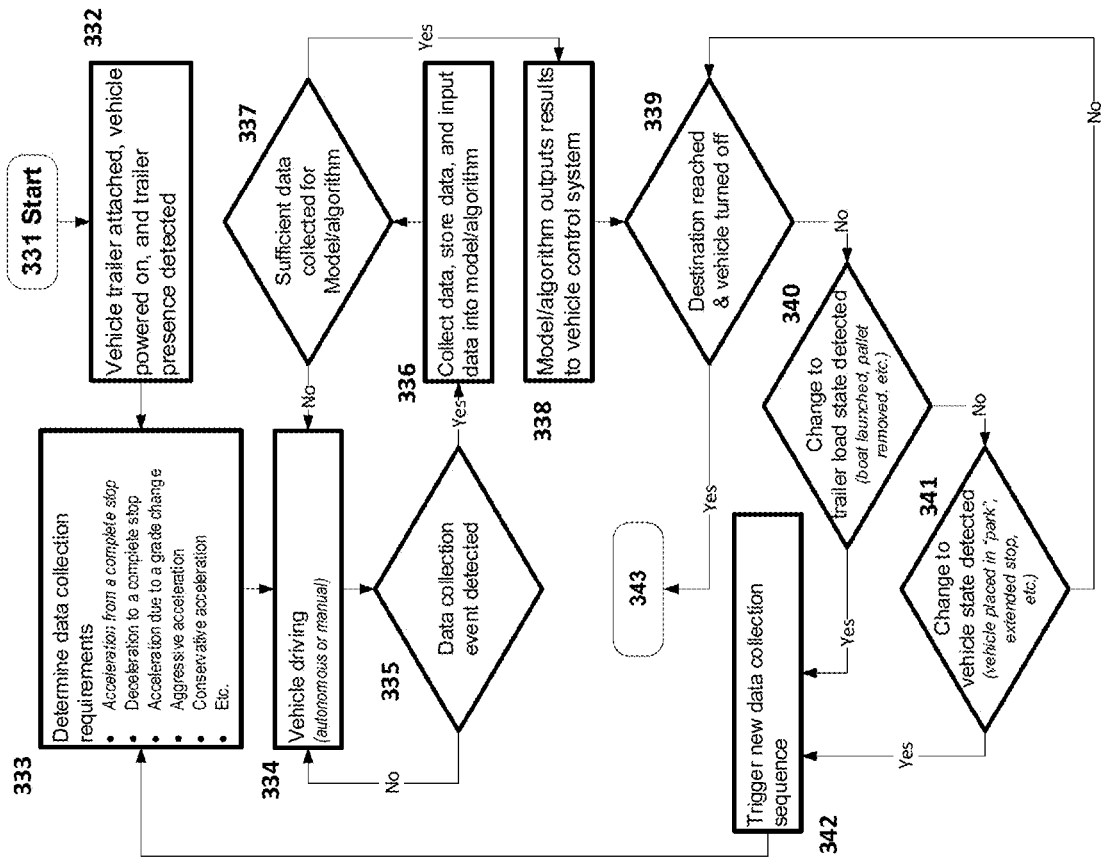
Figure 3D:
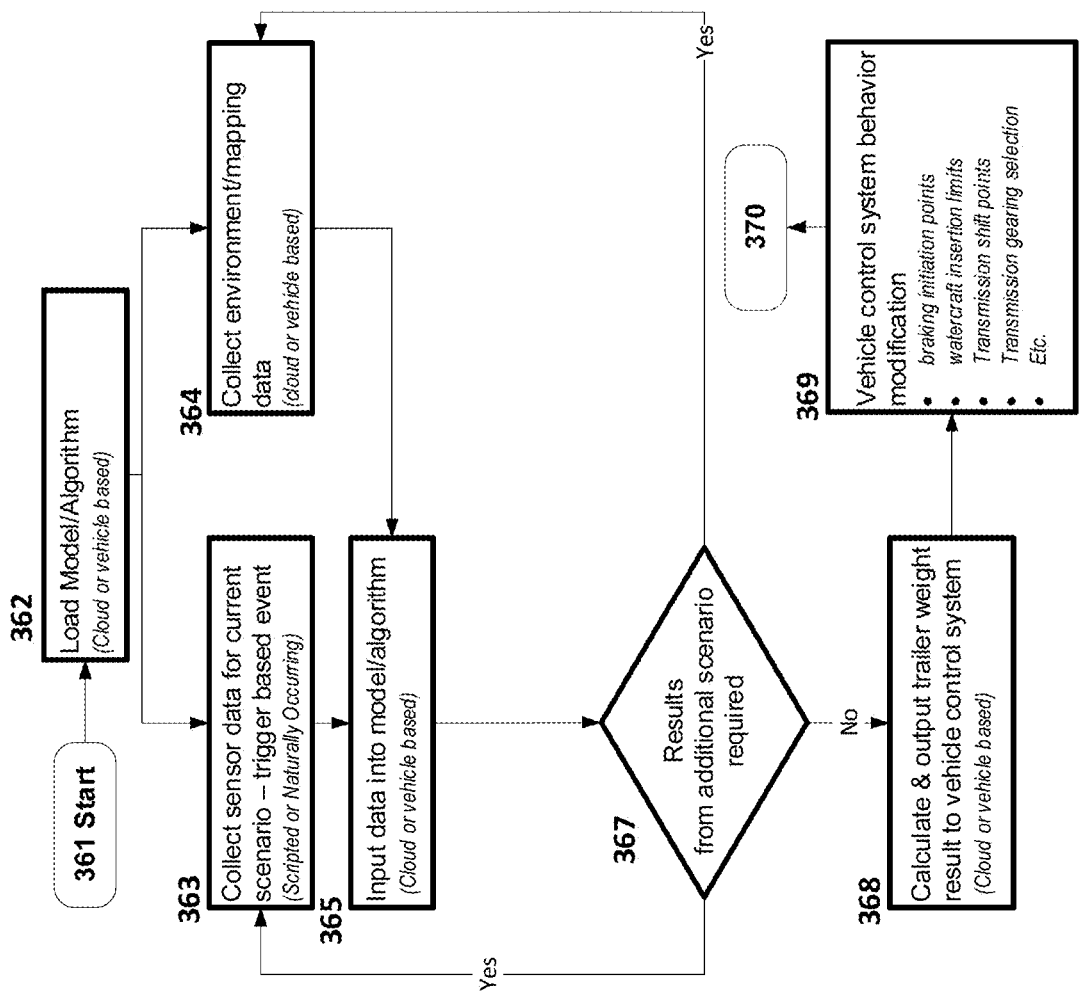

FIGS. 3(a)-3(d) illustrate example processes to be performed to assess suitability of operating a CA/AD vehicle with a trailer, watercraft, or other vehicle in tow in an operation area, in accordance with various embodiments. In embodiments, the processes shown in FIGS. 3(a)-3(d) may be performed by the CA/AD vehicle 110 together with the trailer 150 and the watercraft 190 to navigate the operation area 181 as shown in FIGS. 1(a)-1(e). Furthermore, the process 300 shown in FIG. 3(a) may be an example of the interaction 205 to assess suitability of operating the CA/AD vehicle with the trailer, watercraft, or other vehicle in tow in an operation area. FIG. 3(b)-3(d) show more detailed operations performed for estimating a weight of the trailer.

The process 300 may start at an interaction 301. During the interaction 301, operations may be performed to build a suitability assessment model based on historical data about the CA/AD vehicle, the trailer, the watercraft, or other vehicle collected by a towing data collection unit. For example, at the interaction 301, operations may be performed to build a suitability assessment model based on historical data about the CA/AD vehicle 110, the trailer 150, the watercraft 190, or other vehicle collected by the towing data collection unit 131.

In more detail, as shown in FIG. 3(b), operations may be performed to build a suitability assessment model for estimating a weight of the trailer or other suitability assessment models. Operations may start at the interaction 311. During the interaction 313, operations may be performed to configure controlled conditional test of the CA/AD vehicle, the trailer, and watercraft, to set up various parameters, e.g., trailer weight, road angle/grade, altitude, throttle profile, etc. During the interaction 315, operations may be performed to execute controlled test and collect various training data, e.g., RPM, acceleration, deceleration, speed, etc. During the interaction 317, operations may be performed to store the collected training data. During the interaction 319, operations may be performed to determine whether additional tests are to be performed to collect additional data. During the interaction 321, operations may be performed to build models or processes, e.g., the models or processes 132 processed by the vehicle control unit 135 that may be fixed logic based processes, adaptive learning processes, or machine learning processes, as shown in FIG. 1(c). During the interaction 323, operations may be performed to store the models or processes, e.g., in the cloud 187 or within the storage 137 of the CA/AD vehicle 110 as shown in FIGS. 1(b)-1(c). Operations may end at the interaction 325.

During an interaction 303, operations may be performed to monitor the CA/AD vehicle, the trailer, the watercraft, or other vehicle to collect current data of the CA/AD vehicle, the trailer, the watercraft, or other vehicle. For example, at the interaction 303, operations may be performed to monitor the CA/AD vehicle 110, the trailer 150, the watercraft 190, or the other vehicle to collect current data of the CA/AD vehicle, the trailer, the watercraft, or the other vehicle.

In more detail, as shown in FIG. 3(c), operations may be performed to monitor the CA/AD vehicle, the trailer, the watercraft, or the other vehicle to collect current data for estimating a weight of the trailer, or other suitability assessments. Operations may start at the interaction 331. During the interaction 332, operations may be performed to power on the CA/AD vehicle, attach the trailer, and detect the trailer presence. During the interaction 333, operations may be performed to determine what kind of data to be collected, e.g., acceleration from a complete stop, deceleration to a complete stop, acceleration due to a grade change, aggressive acceleration, conservative acceleration, etc. During the interaction 334, operations may be performed so that the CA/AD vehicle is driving (autonomous or manual). During the interaction 335, operations may be performed to detect data collection event. During the interaction 336, operations may be performed to collect data, store data, and input data into the models or processes, e.g., the models or processes 132 as shown in FIG. 1(c). During the interaction 337, operations may be performed to test whether sufficient data collected for applying the models or processes, or not. During the interaction 338, operations may be performed to inform the vehicle control system the test result on whether sufficient data collected. During the interaction 339, operations may be performed to test whether the CA/AD vehicle has reached its destination. During the interaction 340, operations may be performed to detect any change of the trailer load state, e.g., boat launched, pallet removed, etc. During the interaction 341, operations may be performed to detect the CA/AD vehicle state change, e.g., the CA/AD vehicle placed in "park", extended stop, etc. During the interaction 342, operations may be performed to trigger new data collection sequence, leading to the interaction 333. Operations may end at the interaction 343.

During an interaction 305, operations may be performed to determine a current suitability state of the CA/AD vehicle, the trailer, the watercraft, or other vehicle, based on the assessment model and the collected current data. For example, at the interaction 305, operations may be performed to determine a current suitability state of the CA/AD vehicle, the trailer, the watercraft, or other vehicle, based on the assessment model and the collected current data.

In more detail, as shown in FIG. 3(d), operations may be performed to determine a current suitability state of the CA/AD vehicle for estimating a weight of the trailer. Operations may start at the interaction 361. During the interaction 362, operations may be performed to load the models or processes, e.g., the models or processes 132, from either the cloud or the CA/AD vehicle. During the interaction 363, operations may be performed to collect sensor data for the current scenario—e.g., a trigger-based event (scripted or naturally occurring when the CA/AD vehicle and the trailer are in operation). During the interaction 364, operations may be performed to collect environment/mapping data (cloud or vehicle based). During the interaction 365, operations may be performed to input data into the models or processes, e.g., the models or processes 132, from either the cloud or the CA/AD vehicle. During the interaction 367, operations may be performed to determine whether any additional scenario data collection may be required. During the interaction 368, operations may be performed to calculate and output trailer weight result to vehicle control system (cloud or vehicle based). During the interaction 369, operations may be performed to modify the vehicle control system behavior modification (braking initiation points, watercraft insertion limits, transmission shift points, transmission gearing selection, etc.). Operations may end at the interaction 370.

Figure 4A:
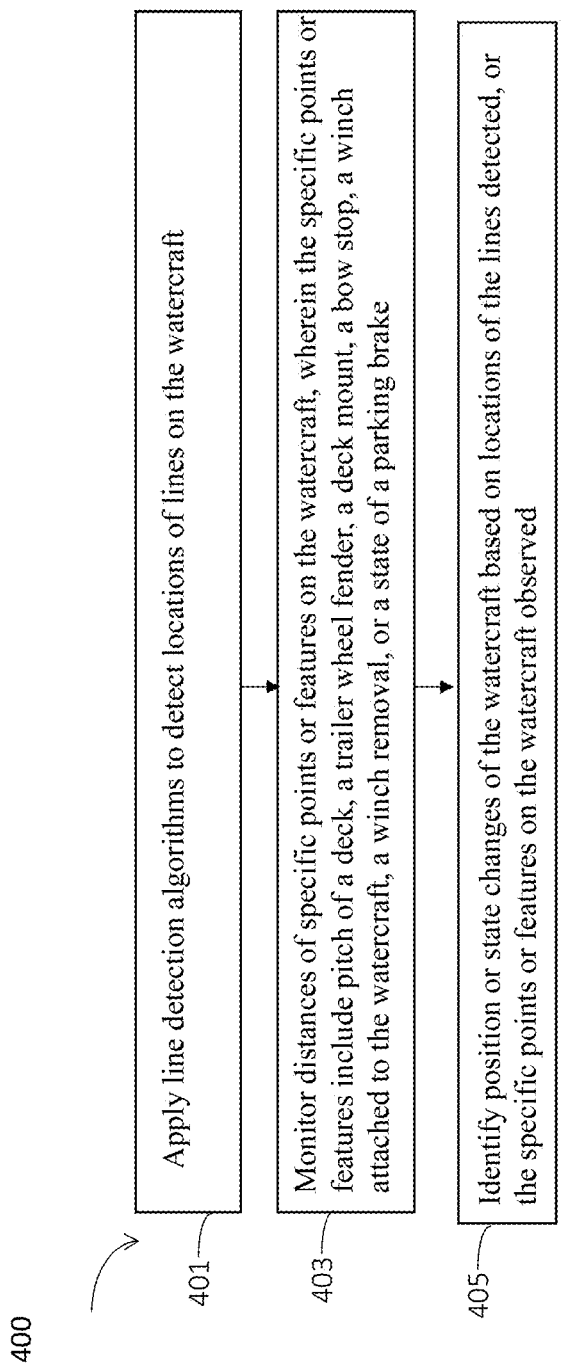
FIGS. 4(a)-4(b) illustrate example processes to be performed to assess states of a watercraft, in accordance with various embodiments.
Figure 4B:
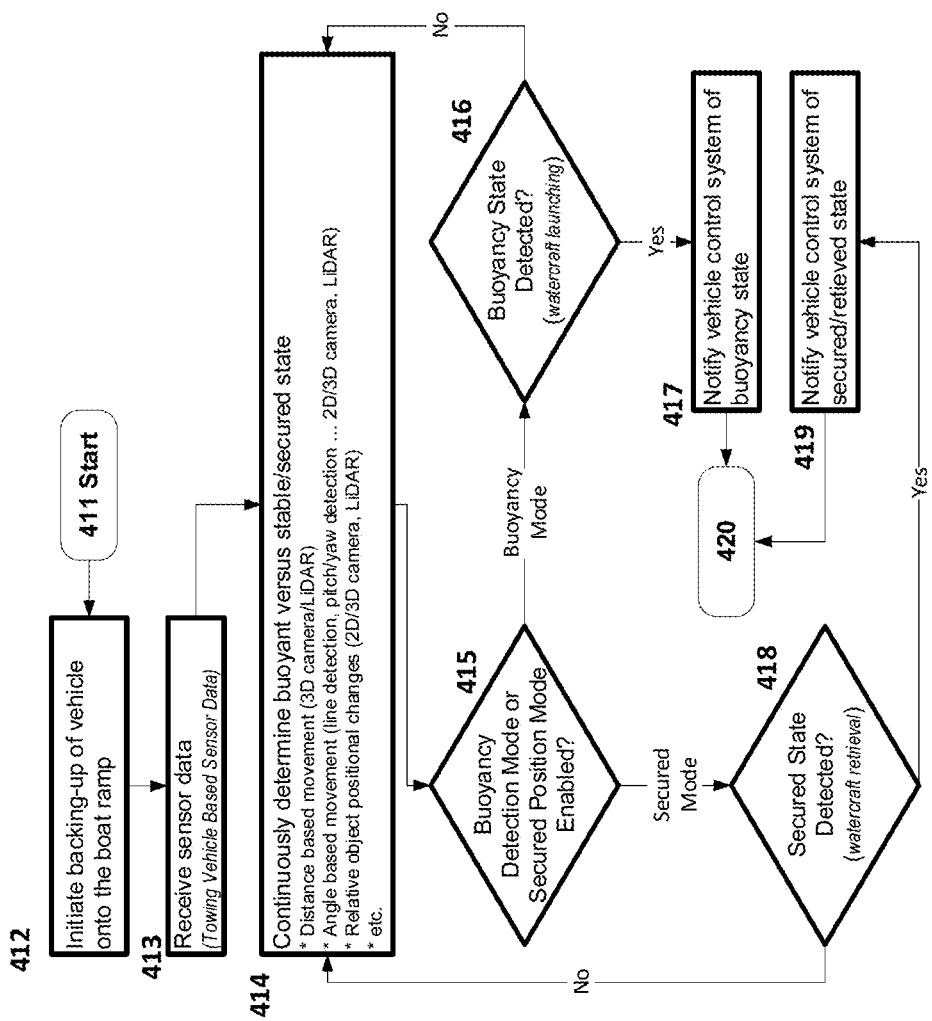

FIGS. 4(a)-4(b) illustrate example processes to be performed to assess states of a watercraft, in accordance with various embodiments. In embodiments, the processes shown in FIGS. 4(a)-4(b) may be performed by the CA/AD vehicle 110 together with the trailer 150 and the watercraft 190 as shown in FIGS. 1(a)-1(e). Furthermore, the process 400 shown in FIG. 4(a) may be an example of the interaction 205 to assess suitability of operating the CA/AD vehicle with the trailer, watercraft, or the other vehicle in tow in the operation area.

The process 400 may start at an interaction 401. During the interaction 401, operations may be performed to apply line detection processes to detect locations of lines on the watercraft. For example, at the interaction 401, operations may be performed to apply line detection processes to detect locations of lines on the watercraft 190.

During an interaction 403, operations may be performed to monitor distances of specific points or features on the watercraft, wherein the specific points or features include pitch of a deck, a trailer wheel fender, a deck mount, a bow stop, a winch attached to the watercraft, a winch removal, or a state of a parking brake. For example, at the interaction 403, operations may be performed to monitor distances of specific points or features on the watercraft 190, where the specific points or features include pitch of a deck, a trailer wheel fender, a deck mount, a bow stop, a winch attached to the watercraft, a winch removal, or a state of a parking brake.

During an interaction 405, operations may be performed to identify position or state changes of the watercraft based on locations of the lines detected, or the specific points or features on the watercraft observed. For example, at the interaction 405, operations may be performed to identify position or state changes of the watercraft 190 based on locations of the lines detected, or the specific points or features on the watercraft observed.

In more detail, as shown in FIG. 4(b), operations may be performed to assess states of a watercraft. Operations may start at the interaction 411. During the interaction 412, operations may be performed to initiate backing-up of the CA/AD vehicle onto the boat ramp. During the interaction 413, operations may be performed to receive sensor data, e.g., towing vehicle based sensor data, from the CA/AD vehicle. During the interaction 414, operations may be performed to continuously determine buoyant versus stable or secured state based on various data, e.g., distance based movement, angle based movement, relative object positional changes, based on sensor data such as LiDAR, or 2D/3D camera, etc. During the interaction 415, operations may be performed to test whether the buoyancy detection mode or secured position mode is enabled for the CA/AD vehicle. During the interaction 416, operations may be performed to detect the buoyancy state, e.g., when watercraft launching. During the interaction 417, operations may be performed to notify the vehicle control system of buoyancy state of the watercraft. During the interaction 418, operations may be performed to detect the secured state, e.g., during watercraft retrieval. During the interaction 419, operations may be performed to notify the vehicle control system of the secured or retrieved state of the watercraft. The operations may end at the interaction 420.

FIGS. 5(a)-5(d) illustrate example processes to be performed to control or assist in the control of operations of a CA/AD vehicle to navigate the CA/AD vehicle in an operation area, in accordance with various embodiments. In embodiments, the processes shown in FIGS. 5(a)-5(d) may be performed by the CA/AD vehicle 110 together with the trailer 150 and the watercraft 190 to navigate the operation area 181 as shown in FIGS. 1(a)-1(e). Furthermore, the process 500 shown in FIG. 5(a) may be an example of the interaction 207 to control operations of the CA/AD vehicle to navigate the CA/AD vehicle in the operation area with the trailer, watercraft, or the other vehicle in tow.

The process 500 may start at an interaction 501. During the interaction 501, operations may be performed to collect data about a service area, a parking area, or a boat ramp area. For example, at the interaction 201, operations may be performed to collect data about the service area 182, the parking area 184, or the boat ramp area 186, collected by the navigation data collection unit 133.

During an interaction 503, operations may be performed to control operations of the CA/AD vehicle to navigate or park the CA/AD vehicle in the service or parking area. For example, at the interaction 503, operations may be performed to control operations of the CA/AD vehicle 110 to navigate or park the CA/AD vehicle 110 in the service area 182 or the parking area 184.

During an interaction 505, operations may be performed to control operations of the CA/AD vehicle to navigate the CA/AD vehicle in the boat ramp area to launch or retrieve the watercraft. For example, at the interaction 505, operations may be performed to control operations of the CA/AD vehicle 110 to navigate the CA/AD vehicle 110 in the boat ramp area 186 to launch or retrieve the watercraft 190.

During an interaction 507, operations may be performed to determine whether the trailer is positioned for the watercraft to be retrieved from water onto the trailer or to be inserted into the water from the trailer. For example, at the interaction 507, operations may be performed to determine whether the trailer 150 is positioned for the watercraft 190 to be retrieved from water onto the trailer 150 or to be inserted into the water from the trailer 150.

Figure 5A:
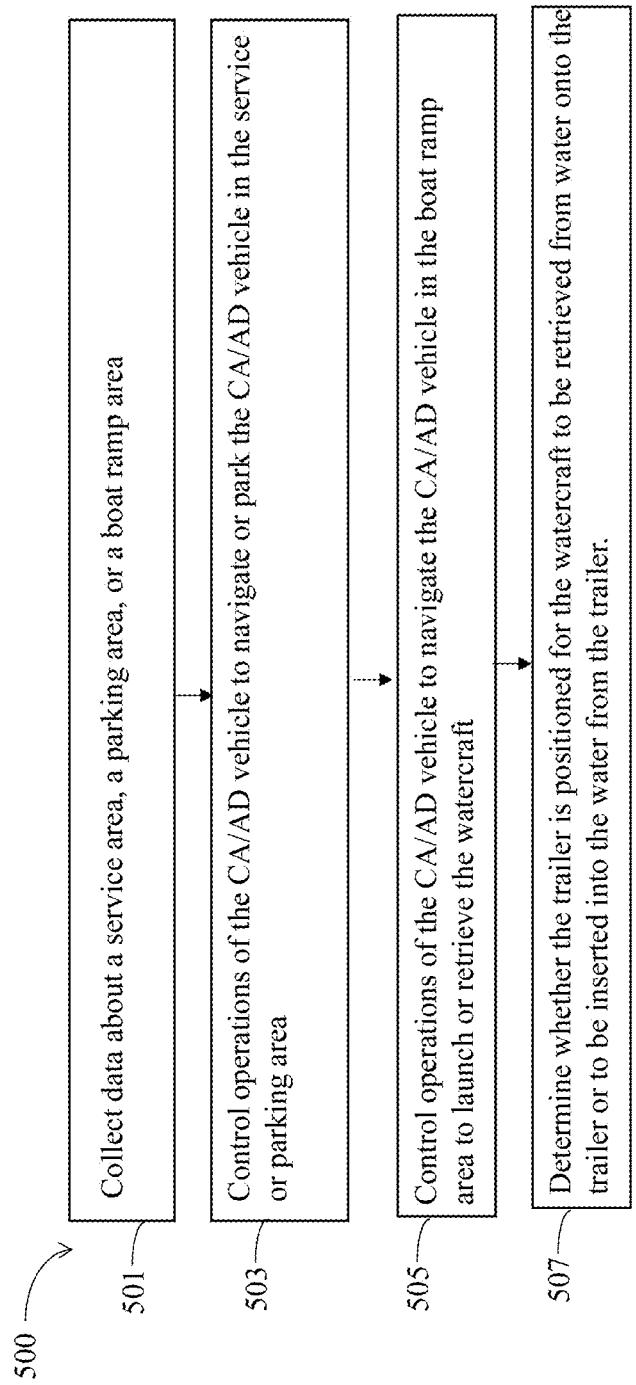
FIGS. 5(a)-5(d) illustrate example processes to be performed to control operations of a CA/AD vehicle with a trailer, a watercraft, or another vehicle in tow to navigate in an operation area, in accordance with various embodiments.
Figure 5B:
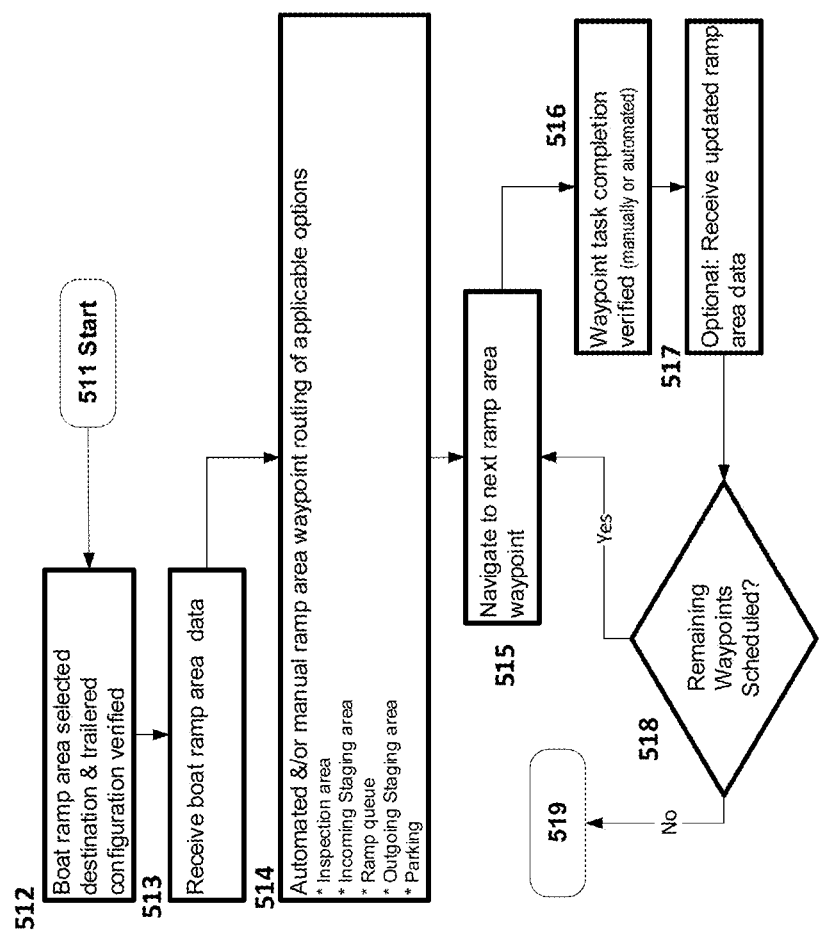

In more detail, as shown in FIG. 5(b), as an example of the interaction 505, operations may be performed to control operations of the CA/AD vehicle to navigate the CA/AD vehicle in the boat ramp area to launch or retrieve the watercraft. Operations may start at the interaction 511. During the interaction 512, operations may be performed to select the boat ramp area as a destination, and to verify the configuration of the trailer for the CA/AD vehicle. During the interaction 513, operations may be performed to receive boat ramp area data. During the interaction 514, operations may be performed to route the CA/AD vehicle, by automated methods or manual methods, to navigate ramp area waypoints, based on data about the boat ramp area, and may include data for other areas, e.g., inspection area, incoming staging area, ramp queue, outgoing staging area, or parking area. During the interaction 515, operations may be performed to navigate to next ramp area waypoint. During the interaction 516, operations may be performed to verify the waypoint task completion. During the interaction 517, operations may be performed to receive updated ramp area data. During the interaction 518, operations may be performed to inspect any other remaining waypoints scheduled to be navigated by the CA/AD vehicle. The operations may end at the interaction 519.

Figure 5C:
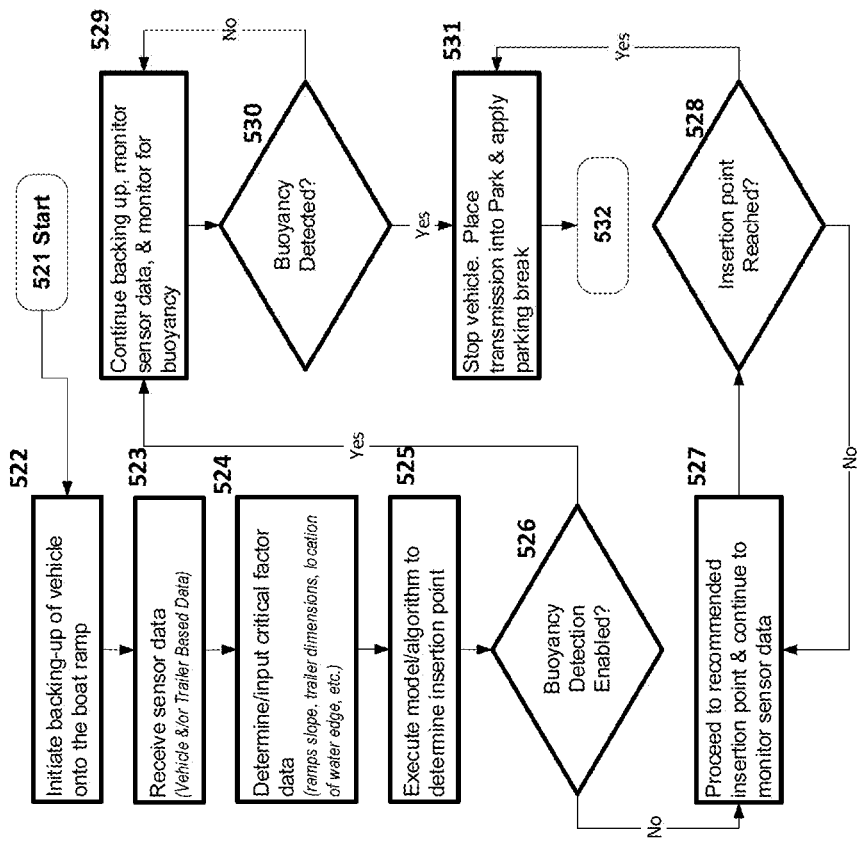

In more detail, as shown in FIG. 5(c), as an example of the interaction 507, operations may be performed to determine whether the trailer is positioned for the watercraft to be retrieved from water onto the trailer or to be inserted into the water from the trailer. Operations may start at the interaction 521. During the interaction 522, operations may be performed to initiate backing up of the CA/AD vehicle onto the boat ramp area. During the interaction 523, operations may be performed to receive data collected by a navigation data collection unit, e.g., navigation data collection unit 133, from the CA/AD vehicle or from the trailer. During the interaction 524, operations may be performed to analyze the collected data and determine the impact of the data, e.g., ramps slope, trailer dimensions, location of water edge, etc. During the interaction 525, operations may be performed to execute models or processes to determine insertion point for the watercraft. During the interaction 526, operations may be performed to detect whether the state detection for the watercraft is enabled. During the interaction 527, when the state detection for the watercraft is not enabled, operations may be performed to proceed to recommended insertion point for the CA/AD vehicle and continue to monitor sensor data. During the interaction 528, operations may be performed to detect whether the CA/AD vehicle has reached the insertion point. During the interaction 528, operations may be performed to stop the CA/AD vehicle when the insertion point is reached. In addition, operations may be performed to place transmission into park and apply parking break for the CA/AD vehicle. On the other hand, during the interaction 529 when the state detection for the watercraft is enabled, operations may be performed to continue backing up, monitor sensor data, monitor for buoyancy state. During the interaction 530, operations may be performed to detect the buoyancy state. When the buoyancy state, the interaction 351 may be performed. The operations may end at the interaction 519.

Figure 5D:
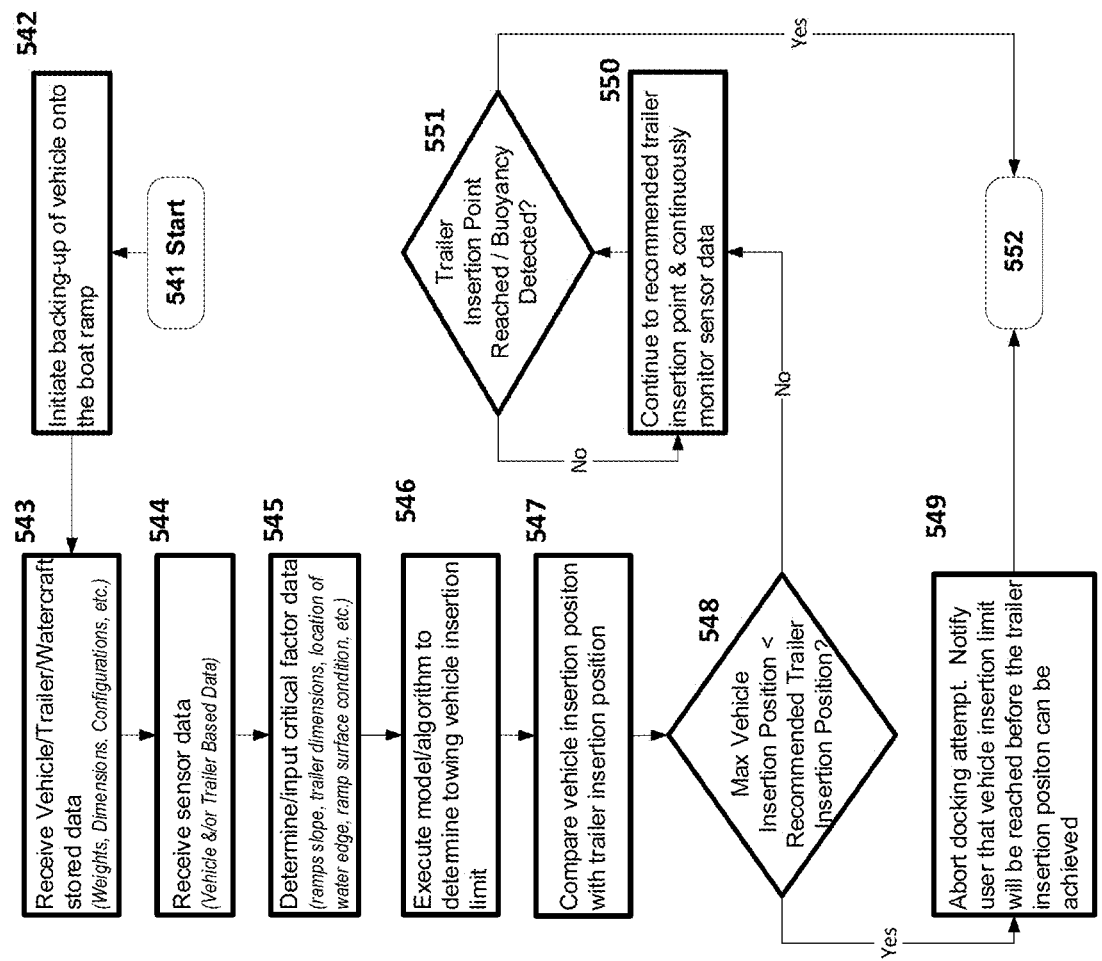

In more detail, as shown in FIG. 5(d), as an example of the interaction 507, operations may be performed to determine whether the trailer is positioned for the watercraft to be retrieved from water onto the trailer or to be inserted into the water from the trailer. Operations may start at the interaction 541. During the interaction 542, operations may be performed to initiate backing up of the CA/AD vehicle onto the boat ramp area. During the interaction 543, operations may be performed to receive data, e.g., the weights, dimensional data, or configurations, stored in the CA/AD vehicle, the trailer, or the watercraft. During the interaction 544, operations may be performed to receive data collected by a navigation data collection unit, e.g., navigation data collection unit 133. During the interaction 545, operations may be performed to analyze the collected data and determine the impact of the data, e.g., ramps slope, trailer dimensions, location of water edge, ramp surface condition, etc. During the interaction 546, operations may be performed to execute models or processes to determine insertion limit for the CA/AD vehicle beyond which point damages may be caused. During the interaction 547, operations may be performed to compare vehicle insertion position with trailer insertion position. During the interaction 548, operations may be performed to determine whether the max vehicle insertion position is smaller than the recommended trailer insertion position or not. During the interaction 549, operations may be performed to abort the docking attempt, when the max vehicle insertion position is smaller than the recommended trailer insertion position. In addition, operations may be performed to notify user that vehicle insertion limit has reached before the trailer insertion position can be achieved. On the other hand, when the max vehicle insertion position is larger than the recommended trailer insertion position, during the interaction 550, operations may be performed to continue to recommended trailer insertion point and continuously monitor sensor data. During the interaction 551, operations may be performed to detect whether the trailer insertion point has reached, or the buoyancy state has been detected. The operations may end at the interaction 552.

Figure 6:
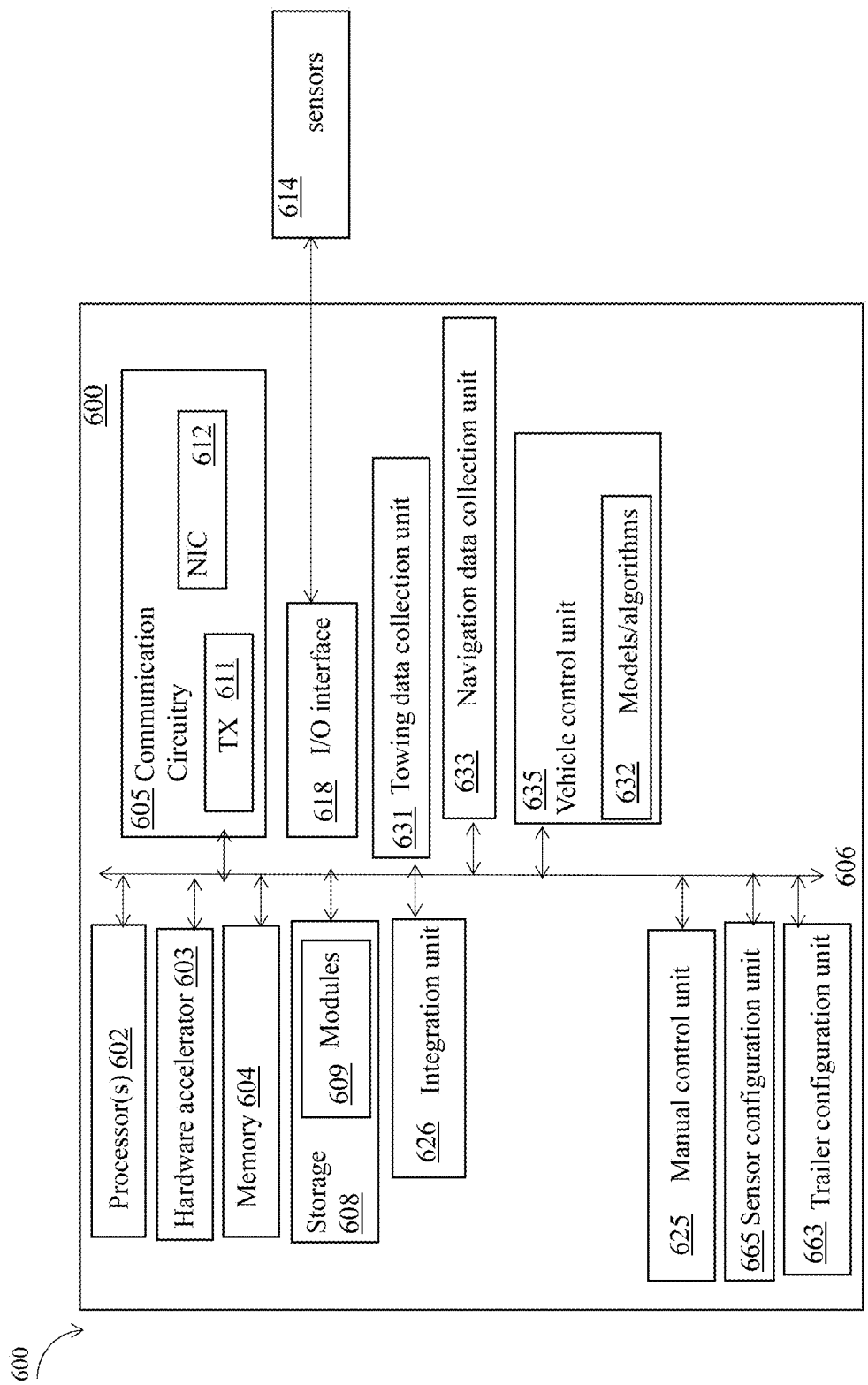
FIG. 6 illustrates an example computer device suitable for use to practice various aspects of the present disclosure, in accordance with various embodiments.

FIG. 6 illustrates an example computer device 600 suitable as a computing platform or device for a CA/AD vehicle, a trailer or a watercraft to practice selected aspects of the present disclosure. The computing platform or device 600 may be used to implement functions of the apparatus 100, the OBU 120, or the OBU 160, as shown in FIGS. 1(a)-1(e). As shown, the device 600 may include one or more processors 602, each having one or more processor cores, or and optionally, a hardware accelerator 603 (which may be an ASIC or a FPGA). In alternate embodiments, the hardware accelerator 603 may be part of processor 602, or integrated together on a SOC. Additionally, the device 600 may include a memory 604, which may be any one of a number of known persistent storage mediums, and a data storage circuitry 608 including modules 609. In addition, the 600 may include an input/output interface 618, coupled to one or more sensors 614. Furthermore, the device 600 may include communication circuitry 605 including a transceiver (Tx) 611, and network interface controller (NIC) 612. The elements may be coupled to each other via system bus 606, which may represent one or more buses. In the case of multiple buses, they may be bridged by one or more bus bridges (not shown).

In addition, the device 600 may include a sensor configuration unit 665, a trailer configuration unit 663, a manual control unit 625, an integration unit 626, a towing data collection unit 631, a navigation data collection unit 633, and/or a vehicle control unit 635 that includes the models or processes 632. In embodiments, the sensor configuration unit 665, the trailer configuration unit 663, the manual control unit 625, the integration unit 626, the towing data collection unit 631, the navigation data collection unit 633, the vehicle control unit 635, and the models or processes 632, may be similar to the corresponding the sensor configuration unit 165, the trailer configuration unit 163, the manual control unit 125, the integration unit 126, the towing data collection unit 131, the navigation data collection unit 133, the vehicle control unit 135, and the models or processes 132, respectively, as shown in FIG. 1(c).

In embodiments, the processor(s) 602 (also referred to as "processor circuitry 602") may be one or more processing elements configured to perform basic arithmetical, logical, and input/output operations by carrying out instructions. Processor circuitry 602 may be implemented as a standalone system/device/package or as part of an existing system/device/package. The processor circuitry 602 may be one or more microprocessors, one or more single-core processors, one or more multi-core processors, one or more multi-threaded processors, one or more GPUs, one or more ultra-low voltage processors, one or more embedded processors, one or more DSPs, one or more FPDs (hardware accelerators) such as FPGAs, structured ASICs, programmable SoCs (PSoCs), etc., and/or other processor or processing/controlling circuit. The processor circuitry 602 may be a part of a SoC in which the processor circuitry 602 and other components discussed herein are formed into a single IC or a single package. As examples, the processor circuitry 602 may include one or more Intel Pentium®, Core®, Xeon®, Atom®, or Core M® processor(s); Advanced Micro Devices (AMD) Accelerated Processing Units (APUs), Epyc®, or Ryzen® processors; Apple Inc. A series, S series, W series, etc. processor(s); Qualcomm Snapdragon® processor(s); Samsung Exynos® processor(s); and/or the like.

In embodiments, the processor circuitry 602 may include a sensor hub, which may act as a coprocessor by processing data obtained from the one or more sensors 614. The sensor hub may include circuitry configured to integrate data obtained from each of the one or more sensors 614 by performing arithmetical, logical, and input/output operations. In embodiments, the sensor hub may capable of timestamping obtained sensor data, providing sensor data to the processor circuitry 602 in response to a query for such data, buffering sensor data, continuously streaming sensor data to the processor circuitry 602 including independent streams for each sensor of the one or more sensors 614, reporting sensor data based upon predefined thresholds or conditions/triggers, and/or other like data processing functions.

In embodiments, the memory 604 (also referred to as "memory circuitry 604" or the like) may be circuitry configured to store data or logic for operating the computer device 600. The memory circuitry 604 may include number of memory devices may be used to provide for a given amount of system memory. As examples, the memory circuitry 604 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, anti-fuses, etc.) that may be configured in any suitable implementation as are known. In various implementations, individual memory devices may be formed of any number of different package types, such as single die package (SDP), dual die package (DDP) or quad die package (Q17P), dual inline memory modules (DIMMs) such as microDIMMs or MiniDIMMs, and/or any other like memory devices. To provide for persistent storage of information such as data, applications, operating systems and so forth, the memory circuitry 604 may include one or more mass-storage devices, such as a solid state disk drive (SSDD); flash memory cards, such as SD cards, microSD cards, xD picture cards, and the like, and USB flash drives; on-die memory or registers associated with the processor circuitry 602 (for example, in low power implementations); a micro hard disk drive (HDD); three dimensional cross-point (3D XPOINT) memories from Intel® and Micron®, etc.

Where FPDs are used, the processor circuitry 602 and memory circuitry 604 (and/or data storage circuitry 608) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor circuitry 602 to implement various logic functions. The memory cells may include any combination of various levels of memory/storage including, but not limited to, EPROM, EEPROM, flash memory, SRAM, antifuses, etc.

In embodiments, the data storage circuitry 608 (also referred to as "storage circuitry 608" or the like), with shared or respective controllers, may provide for persistent storage of information such as modules 609, operating systems, etc. The data storage circuitry 608 may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 602; hard disk drives (HDDs); micro HDDs; resistance change memories; phase change memories; holographic memories; or chemical memories; among others. As shown, the data storage circuitry 608 is included in the computer device 600; however, in other embodiments, the data storage circuitry 608 may be implemented as one or more devices separated from the other elements of computer device 600.

In some embodiments, the data storage circuitry 608 may include an operating system (OS) (not shown), which may be a general purpose operating system or an operating system specifically written for and tailored to the computer device 600. The OS may include one or more drivers, libraries, and/or application programming interfaces (APIs), which provide program code and/or software components for modules 609 and/or control system configurations to control and/or obtain/process data from the one or more sensors 614.

The modules 609 may be software modules/components used to perform various functions of the computer device 600 and/or to carry out functions of the example embodiments discussed herein. In embodiments where the processor circuitry 602 and memory circuitry 604 includes hardware accelerators (e.g., FPGA cells, the hardware accelerator 603) as well as processor cores, the hardware accelerators (e.g., the FPGA cells) may be pre-configured (e.g., with appropriate bit streams, logic blocks/fabric, etc.) with the logic to perform some functions of the embodiments herein (in lieu of employment of programming instructions to be executed by the processor core(s)). For example, the modules 609 may comprise logic for the corresponding entities discussed with regard to the sensor configuration unit 665, the trailer configuration unit 663, the manual control unit 625, the integration unit 626, the towing data collection unit 631, the navigation data collection unit 633, the vehicle control unit 635, and the models or processes 632.

The components of computer device 600 may communicate with one another over the bus 606. The bus 606 may include any number of technologies, such as a Local Interconnect Network (LIN); industry standard architecture (ISA); extended ISA (EISA); PCI; PCI extended (PCIx); PCIe; an Inter-Integrated Circuit (I2C) bus; a Parallel Small Computer System Interface (SPI) bus; Common Application Programming Interface (CAPI); point to point interfaces; a power bus; a proprietary bus, for example, Intel® Ultra Path Interface (UPI), Intel® Accelerator Link (IAL), or some other proprietary bus used in a SoC based interface; or any number of other technologies. In some embodiments, the bus 606 may be a controller area network (CAN) bus system, a Time-Trigger Protocol (TTP) system, or a FlexRay system, which may allow various devices (e.g., the one or more sensors 614, etc.) to communicate with one another using messages or frames.

The communications circuitry 605 may include circuitry for communicating with a wireless network or wired network. For example, the communication circuitry 605 may include transceiver (Tx) 611 and network interface controller (NIC) 612. Communications circuitry 605 may include one or more processors (e.g., baseband processors, modems, etc.) that are dedicated to a particular wireless communication protocol.

NIC 612 may be included to provide a wired communication link to a network and/or other devices. The wired communication may provide an Ethernet connection, an Ethernet-over-USB, and/or the like, or may be based on other types of networks, such as DeviceNet, ControlNet, Data Highway+, PROFIBUS, or PROFINET, among many others. An additional NIC 612 may be included to allow connect to a second network (not shown) or other devices, for example, a first NIC 612 providing communications to the network 150 over Ethernet, and a second NIC 612 providing communications to other devices over another type of network, such as a personal area network (PAN) including a personal computer (PC) device. In some embodiments, the various components of the device 600, such as the one or more sensors 614, etc. may be connected to the processor(s) 602 via the NIC 612 as discussed above rather than via the I/O circuitry 618 as discussed infra.

The Tx 611 may include one or more radios to wirelessly communicate with a network and/or other devices. The Tx 611 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of computer device 600. In some embodiments, the various components of the device 600, such as the one or more sensors 614, etc. may be connected to the device 600 via the Tx 611 as discussed above rather than via the I/O circuitry 618 as discussed infra. In one example, the one or more sensors 614 may be coupled with device 600 via a short range communication protocol.

The Tx611 may include one or multiple radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), and Fifth Generation (5G) New Radio (NR). It can be noted that radios compatible with any number of other fixed, mobile, or satellite communication technologies and standards may be selected. These may include, for example, any Cellular Wide Area radio communication technology, which may include e.g. a 5G communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System—Time-Division Duplex), TD-CDMA (Time Division—Code Division Multiple Access), TD-SCDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated. Implementations, components, and details of the aforementioned protocols may be those known in the art and are omitted herein for the sake of brevity.

The input/output (I/O) interface 618 may include circuitry, such as an external expansion bus (e.g., Universal Serial Bus (USB), FireWire, Thunderbolt, PCI/PCIe/PCIx, etc.), used to connect computer device 600 with external components/devices, such as one or more sensors 614, etc. I/O interface circuitry 618 may include any suitable interface controllers and connectors to interconnect one or more of the processor circuitry 602, memory circuitry 604, data storage circuitry 608, communication circuitry 605, and the other components of computer device 600. The interface controllers may include, but are not limited to, memory controllers, storage controllers (e.g., redundant array of independent disk (RAID) controllers, baseboard management controllers (BMCs), input/output controllers, host controllers, etc. The connectors may include, for example, busses (e.g., bus 606), ports, slots, jumpers, interconnect modules, receptacles, modular connectors, etc. The I/O circuitry 618 may couple the device 600 with the one or more sensors 614, etc. via a wired connection, such as using USB, FireWire, Thunderbolt, RCA, a video graphics array (VGA), a digital visual interface (DVI) and/or mini-DVI, a high-definition multimedia interface (HDMI), an S-Video, and/or the like.

The one or more sensors 614 may be any device configured to detect events or environmental changes, convert the detected events into electrical signals and/or digital data, and transmit/send the signals/data to the computer device 600. Some of the one or more sensors 614 may be sensors used for providing computer-generated sensory inputs. Some of the one or more sensors 614 may be sensors used for motion and/or object detection. Examples of such one or more sensors 614 may include, inter alia, charged-coupled devices (CCD), Complementary metal-oxide-semiconductor (CMOS) active pixel sensors (APS), lens-less image capture devices/cameras, thermographic (infrared) cameras, Light Imaging Detection And Ranging (LIDAR) systems, and/or the like. In some implementations, the one or more sensors 614 may include a lens-less image capture mechanism comprising an array of aperture elements, wherein light passing through the array of aperture elements define the pixels of an image. In embodiments, the motion detection one or more sensors 614 may be coupled with or associated with light generating devices, for example, one or more infrared projectors to project a grid of infrared light onto a scene, where an infrared camera may record reflected infrared light to compute depth information.

Some of the one or more sensors 614 may be used for position and/or orientation detection, ambient/environmental condition detection, and the like. Examples of such one or more sensors 614 may include, inter alia, microelectromechanical systems (MEMS) with piezoelectric, piezoresistive and/or capacitive components, which may be used to determine environmental conditions or location information related to the computer device 600. In embodiments, the MEMS may include 3-axis accelerometers, 3-axis gyroscopes, and/or magnetometers. In some embodiments, the one or more sensors 614 may also include one or more gravimeters, altimeters, barometers, proximity sensors (e.g., infrared radiation detector(s) and the like), depth sensors, ambient light sensors, thermal sensors (thermometers), ultrasonic transceivers, and/or the like.

Each of these elements, e.g., one or more processors 602, the hardware accelerator 603, the memory 604, the data storage circuitry 608 including the modules 609, the input/output interface 618, the one or more sensors 614, the communication circuitry 605 including the Tx 611, and the NIC 612, and the system bus 606, may perform its conventional functions known in the art. In addition, they may be employed to store and host execution of programming instructions implementing the operations associated with towing operations to be performed by an apparatus for computer assisted or autonomous driving, as described in connection with FIGS. 1(*a*)-5(*d*), and/or other functions that provides the capability of the embodiments described in the current disclosure. The various elements may be implemented by assembler instructions supported by processor(s) 602 or high-level languages, such as, for example, C, that can be compiled into such instructions. Operations associated with safety operations and configuration of safety operations not implemented in software may be implemented in hardware, e.g., via hardware accelerator 603.

The number, capability and/or capacity of these elements 602-665 may vary, depending on the number of other devices the device 600 is configured to support. Otherwise, the constitutions of elements 602-665 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 7:
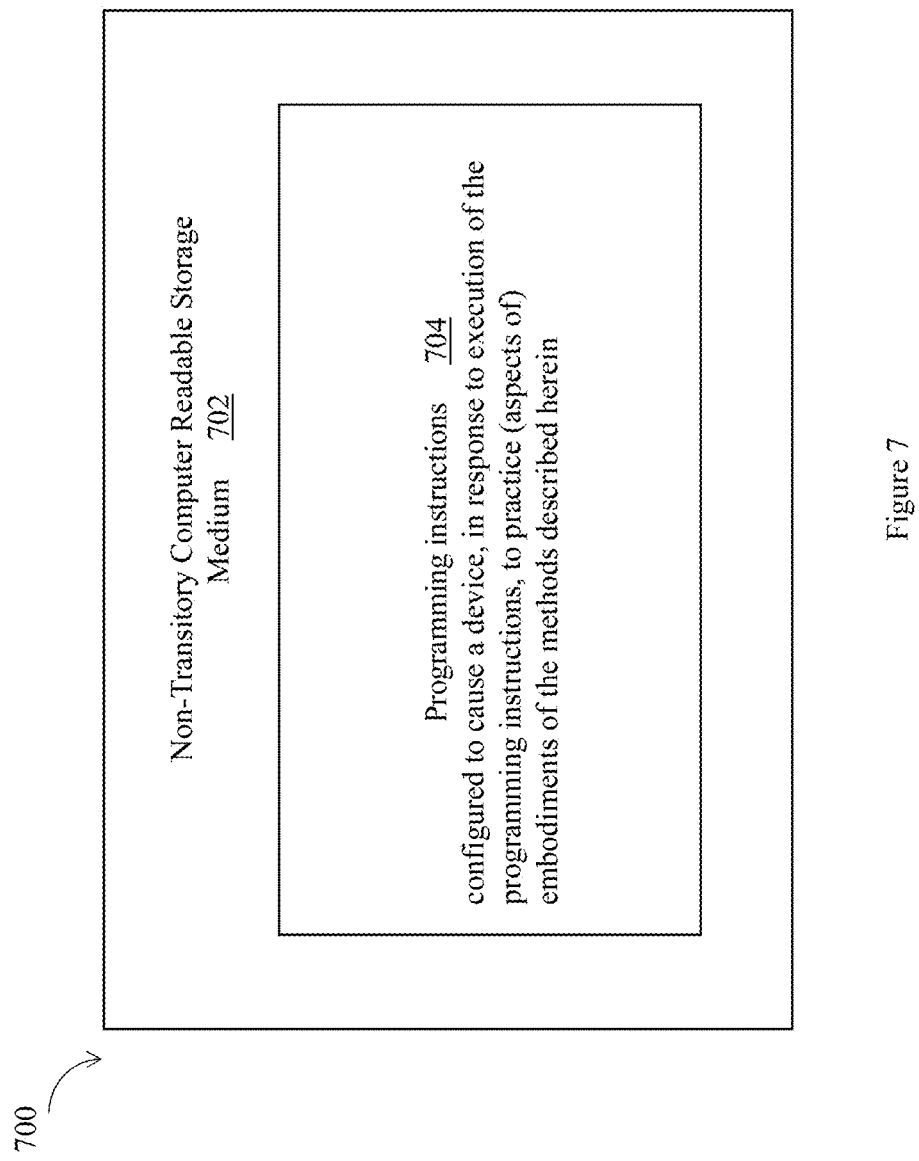
FIG. 7 illustrates a storage medium having instructions for practicing methods described with references to FIGS. 1-6, in accordance with various embodiments.

Furthermore, the present disclosure may take the form of a computer program product embodied in any tangible or non-transitory medium of expression having computer-usable program code embodied in the medium. FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 702 may include a number of programming instructions 704. Programming instructions 704 may be configured to enable a device, e.g., device 600, in response to execution of the programming instructions, to perform, e.g., various operations associated with an apparatus included in a CA/AD vehicle coupled with a trailer and a watercraft, to assist in the towing of the trailer, watercraft, and/or another vehicle, as shown in FIG. 1(*a*)-FIG. 6.

In alternate embodiments, programming instructions 704 may be disposed on multiple computer-readable non-transitory storage media 702 instead. In alternate embodiments, programming instructions 704 may be disposed on computer-readable transitory storage media 702, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may include an apparatus for computer assisted or autonomous driving (CA/AD), comprising: a towing data collection unit disposed in a CA/AD vehicle to collect data about a trailer, a watercraft, or another vehicle to be towed or being towed by the CA/AD vehicle; and a vehicle control unit disposed in the CA/AD vehicle, and coupled to the towing data collection unit, to assess suitability of operating the CA/AD vehicle with the trailer, watercraft, or the other vehicle in tow, based at least in part on the data about the trailer, the watercraft, or the other vehicle collected by the towing data collection unit.

Example 2 may include the apparatus of example 1 and/or some other examples herein, wherein the data about the trailer, the watercraft, or the other vehicle collected by the towing data collection unit include: data about the trailer, watercraft, or the other vehicle collected during operation of the CA/AD vehicle with the trailer, the watercraft or the other vehicle in tow; data about the trailer, the watercraft, or the other vehicle collected in a controlled environment; data about the trailer, the watercraft, or the other vehicle collected at multiple points of time or multiple locations to establish interdependencies between the data; data about the trailer, the watercraft, or the other vehicle accumulated over time; crowdsourced data from other CA/AD vehicles about the trailer, the watercraft, or the other vehicle; or public data, subscription service data, vehicle original equipment manufacturer (OEM data), or user configured data about the trailer, the watercraft, or the other vehicle.

Example 3 may include the apparatus of example 1 and/or some other examples herein, wherein the data about the trailer, the watercraft, or the other vehicle collected by the towing data collection unit include: engine revolutions per minute (RMP) of an engine vehicle pitch, angle, speed, tire size, number of axles, dry weight, data about automated changes to transmission shifting behaviors, gas mileage, acceleration, throttle control profile, braking control profile, vehicle altitude, or dimensional data of the CA/AD vehicle, the trailer, or the watercraft.

Example 4 may include the apparatus of example 1 and/or some other examples herein, wherein the towing data collection unit include one or more components selected from a radar, a ultrasonic sensor, a video sensor, a light detection and ranging (LiDAR) sensor, a global positioning system (GPS) sensor, a 2 dimensional camera, a 3 dimensional camera, a location sensor, a water pressure sensor, a force sensor, a load sensor, a pitch sensor, or an accelerometer.

Example 5 may include the apparatus of example 1 and/or some other examples herein, wherein to assess the suitability of operating the CA/AD vehicle with the trailer, the watercraft, or the other vehicle in tow, the vehicle control unit is arranged to: build a suitability assessment model based on historical data about the CA/AD vehicle, the trailer, the watercraft, or the other vehicle collected by the towing data collection unit; monitor the CA/AD vehicle, the trailer, the watercraft, or the other vehicle to collect current data of the CA/AD vehicle, the trailer, the watercraft, or the other vehicle; and determine a current suitability state of the CA/AD vehicle, the trailer, the watercraft, or the other vehicle, based on the assessment model and the collected current data.

Example 6 may include the apparatus of example 5 and/or some other examples herein, wherein the suitability assessment model is built based on fixed logic based processes, adaptive learning processes, or machine learning processes.

Example 7 may include the apparatus of example 1 and/or some other examples herein, wherein to assess the suitability of operating the CA/AD vehicle with the trailer, watercraft, or the other vehicle in tow, the vehicle control unit is arranged to: detect a presence of the trailer coupled to the CA/AD vehicle; verify that mechanical or electrical connections between the trailer and the CA/AD vehicle are in operational states; detect a loading state of the trailer; or estimate a weight of the trailer.

Example 8 may include the apparatus of example 1 and/or some other examples herein, wherein to assess the suitability of operating the CA/AD vehicle with the trailer, watercraft, or the other vehicle in tow, the vehicle control unit is arranged to: verify safety functions of the watercraft; or determine the watercraft is in a secure state or a float state.

Example 9 may include the apparatus of example 8 and/or some other examples herein, wherein to assess the suitability of operating the CA/AD vehicle with the trailer, watercraft, or the other vehicle in tow, the vehicle control unit is arranged to: apply line detection processes to detect locations of lines on the watercraft; monitor distances of specific points or features on the watercraft, wherein the specific points or features include pitch of a deck, a trailer wheel fender, a deck mount, a bow stop, a winch attached to the watercraft, a winch removal, or a state of a parking brake; or identify position or state changes of the watercraft based on locations of the lines detected, or the specific points or features on the watercraft observed; based on data including water level data, water edge data, or data about motions of the watercraft.

Example 10 may include the apparatus of example 1 and/or some other examples herein, wherein the CA/AD vehicle is a selected one of a commercial truck, a light duty car, a sport utility vehicle (SUV), a light vehicle, a heavy duty vehicle, a pickup truck, a van, a car, or a motorcycle.

Example 11 may include the apparatus of example 1 and/or some other examples herein, wherein the trailer includes a selected one of a boat, an all-terrain vehicle, a general purpose trailer, a mobile home, a motorcycle trailer, a bicycle trailer, a utility trailer, a travel trailer, a camper, a genset trailer, a pusher trailer, a semi-trailer, or a full trailer.

Example 12 may include the apparatus of example 1 and/or some other examples herein, wherein the apparatus is a vehicle onboard unit (OBU) disposed in the CA/AD vehicle.

Example 13 may include the apparatus of example 1 and/or some other examples herein, wherein the apparatus is the CA/AD vehicle comprising an vehicle onboard unit (OBU).

Example 14 may include an apparatus for computer assisted or autonomous driving (CA/AD), comprising: a navigation data collection unit disposed in a CA/AD vehicle to collect data about an operation area; and a vehicle control unit disposed in the CA/AD vehicle, and coupled to the navigation data collection unit, to control operations of the CA/AD vehicle to navigate the CA/AD vehicle in the operation area with a trailer, a watercraft, or another vehicle in tow; based at least in part on the data about the operation area collected by the navigation data collection unit, and data about the trailer, the watercraft, or the other vehicle.

Example 15 may include the apparatus of example 14 and/or some other examples herein, wherein the navigation data collection unit is arranged to collect data about a service or parking area; and the vehicle control unit is arranged to control operations of the CA/AD vehicle to navigate or park the CA/AD vehicle in the service or parking area with the trailer, the watercraft, or the other vehicle in tow, based at least in part on the data about the service or parking area collected by the navigation data collection unit, and data about the trailer, the watercraft, or the other vehicle.

Example 16 may include the apparatus of example 15 and/or some other examples herein, wherein the data about the service or parking area include data about incoming traffic, outgoing traffic, a queue of waiting vehicles, or configuration of the parking area or the service area.

Example 17 may include the apparatus of example 14 and/or some other examples herein, wherein the navigation data collection unit is arranged to collect data about a boat ramp area; and the vehicle control unit is arranged to control operations of the CA/AD vehicle to navigate the CA/AD vehicle in the boat ramp area to launch or retrieve the watercraft, with at least the trailer in tow, based at least in part on the data about the boat ramp area collected by the navigation data collection unit, and data about the trailer, the watercraft, or the other vehicle.

Example 18 may include the apparatus of example 17 and/or some other examples herein, wherein the data about the boat ramp area includes data about ramp surface conditions relevant to traction, surface roughness of the boat ramp area, slope of the boat ramp area, water level, water edge location, or weather data including icy condition or mossy condition data.

Example 19 may include the apparatus of example 17 and/or some other examples herein, wherein to control operations of the CA/AD vehicle to navigate the CA/AD vehicle in the boat ramp area to launch or retrieve the watercraft includes to: determine whether the trailer is positioned for the watercraft to be retrieved from water onto the trailer or to be inserted into water from the trailer.

Example 20 may include the apparatus of example 14 and/or some other examples herein, further comprising a towing data collection unit disposed in the CA/AD vehicle, and coupled to the vehicle control unit, to collect the data about the trailer, the watercraft, or the other vehicle being towed by the CA/AD vehicle.

Example 21 may include one or more non-transitory computer-readable media comprising instructions that cause an in-vehicle system (IVS) of a computer assisted or autonomous driving (CA/AD) vehicle, in response to execution of the instructions by the IVS, to: collect data about a trailer, a watercraft, or another vehicle to be towed or being towed by the CA/AD vehicle; collect data about an operation area including a service area, a parking area, and a boat ramp area; and assess suitability of operating the CA/AD vehicle with the trailer, watercraft, or the other vehicle in tow in the operation area, or control operations of the CA/AD vehicle to navigate the CA/AD vehicle in the operation area with the trailer, watercraft, or the other vehicle in tow, based at least in part on the collected data about the operation area, and the collected data about the trailer, the watercraft, or the other vehicle.

Example 22 may include the one or more non-transitory computer-readable media of example 21 and/or some other examples herein, wherein to assess the suitability of operating the CA/AD vehicle with the trailer, watercraft, or the other vehicle in tow, the vehicle control unit is arranged to: detect a presence of the trailer coupled to the CA/AD vehicle; verify that mechanical and electrical connections between the trailer and the CA/AD vehicle are in operational states; detect a loading state of the trailer; estimate a weight of the trailer; verify safety functions of the watercraft; or determine the watercraft is in a secure state or a float state.

Example 23 may include the one or more non-transitory computer-readable media of example 21 and/or some other examples herein, wherein to assess the suitability of operating the CA/AD vehicle with the trailer, watercraft, or the other vehicle in tow, the vehicle control unit is arranged to: build a suitability assessment model based on historical data about the CA/AD vehicle, the trailer, the watercraft, or the other vehicle collected by the towing data collection unit; monitor the CA/AD vehicle, the trailer, the watercraft, or the other vehicle to collect current data of the CA/AD vehicle, the trailer, the watercraft, or the other vehicle; and determine a current suitability state of the CA/AD vehicle, the trailer, the watercraft, or the other vehicle, based on the assessment model and the collected current data.

Example 24 may include the one or more non-transitory computer-readable media of example 21 and/or some other examples herein, wherein to assess the suitability of operating the CA/AD vehicle with the trailer, watercraft, or the other vehicle in tow, the vehicle control unit is arranged to: apply line detection processes to detect locations of lines on the watercraft; monitor distances of specific points or features on the watercraft, wherein the specific points or features include pitch of a deck, a trailer wheel fender, a deck mount, a bow stop, a winch attached to the watercraft, a winch removal, or a state of a parking brake; or identify position or state changes of the watercraft based on locations of the lines detected, or the specific points or features on the watercraft observed; based on data including water level data, water edge data, or data about motions of the watercraft.

Example 25 may include the one or more non-transitory computer-readable media of example 21 and/or some other examples herein, wherein to control operations of the CA/AD vehicle to navigate the CA/AD vehicle in the operation area, the vehicle control unit is arranged to: control operations of the CA/AD vehicle to navigate the CA/AD vehicle in the boat ramp area to launch or retrieve the watercraft; or determine whether the trailer is positioned for the watercraft to be retrieved from water onto the trailer or to be inserted into water from the trailer.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:

1. An apparatus for computer assisted or autonomous driving (CA/AD) of a CA/AD vehicle, the apparatus comprising:
    interface circuitry; and
    processor circuitry communicatively coupled with memory circuitry and the interface circuitry, the processor circuitry configured to:
        operate a towing data collector to collect data about an object to be towed or being towed by the CA/AD vehicle ("towed object") via the interface circuitry, wherein the towed object is a trailer, a watercraft, or another vehicle;
        operate a vehicle controller to assess suitability of operating the CA/AD vehicle with the towed object based at least in part on the data about the towed object collected by the towing data collector;
        operate an integration unit to determine a combined level of driving automation for the CA/AD vehicle with the towed object based at least in part on the data about the towed object collected by the towing data collector, the CA/AD vehicle having an initial level of driving automation for the CA/AD vehicle without the towed object; and
        operate the vehicle controller to operate the CA/AD vehicle according to the determined combined level of driving automation.

2. The apparatus of claim 1, wherein the data about the towed object collected by the towing data collector include one or more of:
    data about the towed object collected during operation of the CA/AD vehicle with the towed object;
    data about the towed object collected in a controlled environment;
    data about the towed object collected at multiple points of time or multiple locations to establish interdependencies between the data;
    data about the towed object accumulated over time;
    crowdsourced data from other CA/AD vehicles about the towed object; or
    public data, subscription service data, vehicle original equipment manufacturer (OEM) data, or user configured data about the towed object.

3. The apparatus of claim 1, wherein the data about the towed object collected by the towing data collector include one or ore of:
    engine revolutions per minute (RPM) of an engine, vehicle pitch, angle, speed, tire size, number of axles, dry weight, data about automated changes to transmission shifting behaviors, gas mileage, acceleration, throttle control profile, braking control profile, vehicle altitude, or dimensional data of the CA/AD vehicle, the trailer, or the watercraft.

4. The apparatus of claim 1, wherein the interface circuitry communicatively couples the apparatus to one or more of a radar, an ultrasonic sensor, a video sensor, a light detection and ranging (LiDAR) sensor, a global positioning system (GPS) sensor, a 2 dimensional camera, a 3 dimensional camera, a location sensor, a water pressure sensor, a force sensor, a load sensor, a pitch sensor, and an accelerometer.

5. The apparatus of claim 1, wherein, to assess the suitability of operating the CA/AD vehicle with the towed object, the vehicle controller is to:
    generate a suitability assessment model based on historical data about the CA/AD vehicle and the data about the towed object collected by the towing data collector;
    monitor the CA/AD vehicle and the towed object to collect current data of the CA/AD vehicle and the towed object; and
    determine a current suitability state of the CA/AD vehicle and the towed object, based on the suitability assessment model and the collected current data.

6. The apparatus of claim 5, wherein the suitability assessment model is built based on fixed logic based processes, adaptive learning processes, or machine learning processes.

7. The apparatus of claim 1, wherein, to assess the suitability of operating the CA/AD vehicle with the towed object when the towed object is the trailer, the vehicle controller is to:
- detect a presence of the trailer coupled to the CA/AD vehicle;
- verify that mechanical or electrical connections between the trailer and the CA/AD vehicle are in operational states;
- detect a loading state of the trailer; or
- estimate a weight of the trailer.

8. The apparatus of claim 1, wherein, to assess the suitability of operating the CA/AD vehicle with the towed object when the towed object is the watercraft, the vehicle controller is to:
- verify safety functions of the watercraft; or
- determine the watercraft is in a secure state or a float state.

9. The apparatus of claim 8, wherein, to assess the suitability of operating the CA/AD vehicle with the towed object, the vehicle controller is to:
- apply line detection processes to detect locations of lines on the watercraft;
- monitor specific points or features on the watercraft, wherein the specific points or features include pitch of a deck, a trailer wheel fender, a deck mount, a bow stop, a winch attached to the watercraft, a winch removal, or a state of a parking brake; or
- identify position or state changes of the watercraft based on locations of the lines detected, or the specific points or features on the watercraft observed, based at least in part on data including water level data, water edge data, or data about motions of the watercraft.

10. The apparatus of claim 1, wherein the CA/AD vehicle is a selected one of a commercial truck, a light duty car, a sport utility vehicle (SUV), a light vehicle, a heavy duty vehicle, a pickup truck, a van, a car, or a motorcycle.

11. The apparatus of claim 1, wherein the towed object includes a selected one of a boat, an all-terrain vehicle, a general purpose trailer, a mobile home, a motorcycle trailer, a bicycle trailer, a utility trailer, a travel trailer, a camper, a genset trailer, a pusher trailer, a semi-trailer, or a full trailer.

12. The apparatus of claim 1, wherein the apparatus is a vehicle onboard unit (OBU) disposed in the CA/AD vehicle.

13. The apparatus of claim 1, wherein the apparatus is a vehicle onboard unit (OBU) disposed in the CA/AD vehicle, and wherein the combined level of driving automation for the CA/AD vehicle with the towed object is a lower level of driving automation than the initial level of driving automation for the CA/AD vehicle without the towed object.

14. An apparatus for computer assisted or autonomous driving (CA/AD) of a CA/AD vehicle, comprising:
- interface circuitry; and
- processor circuitry communicatively coupled with memory circuitry and the interface circuitry, the processor circuitry configured to:
  - execute an integration unit to determine a combined level of driving automation for the CA/AD vehicle with an object to be towed or being towed by the CA/AD vehicle ("towed object") based at least in part on data collected about the towed object collected wherein the CA/AD vehicle has an initial level of driving automation for the CA/AD vehicle without the towed object;
  - execute a navigation data collector to collect data about an operation area; and
  - execute a vehicle controller to control operations of the CA/AD vehicle to navigate the CA/AD vehicle in the operation area with the towed object based at least in part on the data about the operation area collected by the navigation data collector, and data about the towed object.

15. The apparatus of claim 14, wherein the processor circuitry is further to:
- execute the navigation data collector to collect data about a service or parking area; and
- execute the vehicle controller to control operations of the CA/AD vehicle to navigate or park the CA/AD vehicle in the service or parking area with the towed object based at least in part on the data about the service or parking area collected by the navigation data collector and data about the towed object.

16. The apparatus of claim 15, wherein the data about the service or parking area include data about incoming traffic, outgoing traffic, a queue of waiting vehicles, or configuration of the parking area or the service area.

17. The apparatus of claim 14, wherein the towed object is a watercraft, and the processor circuitry is further to:
- execute the navigation data collector to collect data about a boat ramp area; and
- execute the vehicle controller to control operations of the CA/AD vehicle to navigate the CA/AD vehicle in the boat ramp area to launch or retrieve the towed object based at least in part on the data about the boat ramp area collected by the navigation data collector, and data about the towed object.

18. The apparatus of claim 17, wherein the data about the boat ramp area includes data about ramp surface conditions relevant to traction, surface roughness of the boat ramp area, slope of the boat ramp area, water level, water edge location, or weather including icy condition or mossy condition.

19. The apparatus of claim 17, wherein, to control operations of the CA/AD vehicle to navigate the CA/AD vehicle in the boat ramp area to launch or retrieve the watercraft, the processor circuitry is further to:
- execute the vehicle controller or the navigation data collector to determine whether a trailer is positioned for the watercraft to be retrieved from water onto the trailer or to be inserted into water from the trailer.

20. The apparatus of claim 14, wherein the processor circuitry is further to execute a towing data collector to collect the data about the towed object.

21. One or more non-transitory computer-readable media (NTCRM) comprising instructions, wherein execution of the instructions by an in-vehicle system (IVS) of a computer assisted or autonomous driving (CA/AD) vehicle, is to cause the IVS to:
- collect data about an object to be towed or being towed by the CA/AD vehicle ("towed object");
- collect data about an operation area, wherein the operation area includes one or more of a service area, a parking area, and a boat ramp area;
- assess suitability of operating the CA/AD vehicle with the towed object in the operation area based at least in part on the collected data about the towed object;
- determine a combined level of driving automation for the CA/AD vehicle with the towed object based at least in part on the collected data about the towed object, the CA/AD vehicle having an initial level of driving automation for the CA/AD vehicle without the towed object; and
- control operations of the CA/AD vehicle to navigate the CA/AD vehicle in the operation area with the towed object based at least in part on the collected data about the operation area.

22. The one or more NTCRM of claim 21, wherein to assess the suitability of operating the CA/AD vehicle with the towed object, execution of the instructions is to further cause the IVS to:
- detect a presence of the towed object coupled to the CA/AD vehicle;
- verify mechanical and electrical connections between the towed object and the CA/AD vehicle are in operational states;
- detect a loading state of the towed object;
- estimate a weight of the towed object;
- verify safety functions of the towed object; or
- determine whether the towed object is in a secure state or a float state.

23. The one or more NTCRM of claim 21, wherein, to assess the suitability of operating the CA/AD vehicle with the towed object, execution of the instructions is to further cause the IVS to:
- collect data about the towed object;
- build a suitability assessment model based on historical data about the CA/AD vehicle and the collected data about the towed object;
- monitor the CA/AD vehicle and the towed object to collect current data of the CA/AD vehicle and the towed object; and
- determine a current suitability state of the CA/AD vehicle and the towed object based on the assessment model and the collected current data.

24. The one or more NTCRM of claim 21, wherein, to assess the suitability of operating the CA/AD vehicle with the towed object when the towed object is a watercraft, execution of the instructions is to further cause the IVS to:
- apply line detection processes to detect locations of lines on the towed object;
- monitor specific points or features on the towed object, wherein the specific points or features include pitch of a deck, a trailer wheel fender, a deck mount, a bow stop, a winch attached to the watercraft, a winch removal, or a state of a parking brake; or
- identify position or state changes of the towed object based on locations of the lines detected, or the specific points or features on the watercraft observed;
- based on data including water level data, water edge data, or data about motions of the towed object.

25. The one or more NTCRM of claim 21, wherein, to assess the suitability of operating the CA/AD vehicle with the towed object when the towed object is a trailer, execution of the instructions is to further cause the IVS to:
- control operations of the CA/AD vehicle to navigate the CA/AD vehicle in the boat ramp area to launch or retrieve the towed object; or
- determine whether the trailer is positioned for the towed object to be loaded or offloaded.

\* \* \* \* \*

UNITED STATES PATENT AND TRADEMARK OFFICE
CERTIFICATE OF CORRECTION

PATENT NO.         : 11,334,071 B2
APPLICATION NO.    : 16/228175
DATED              : May 17, 2022
INVENTOR(S)        : Jason Garcia Page 1 of 1

It is certified that error appears in the above-identified patent and that said Letters Patent is hereby corrected as shown below:

In the Claims

Column 30
Line 33, "one or ore of:" should read "one or more of:"

Column 31
Lines 60-61, "...the towed object collected wherein..." should read "...the towed object, wherein..."

Signed and Sealed this
Second Day of August, 2022

Katherine Kelly Vidal
*Director of the United States Patent and Trademark Office*